US009960642B2

(12) United States Patent
Ozana et al.

(10) Patent No.: US 9,960,642 B2
(45) Date of Patent: May 1, 2018

(54) EMBEDDED INTERFACE FOR WIRELESS POWER TRANSFER TO ELECTRICAL DEVICES

(71) Applicant: Powermat Technologies, Ltd., Neve Ilan (IL)

(72) Inventors: Charlie Ozana, Or Akiva (IL); Rachel Ben Hanoch, Givat Shmuel (IL); Einav Sadan Duschack, Tel Aviv (IL); Yossi Azancot, Jerusalem (IL); Amir Ben-Shalom, Modiin (IL); Oola Greenwald, Mevasseret Zion (IL); Arik Rofe, Jerusalem (IL); Alfred Lei-Bovitz, Petach Tikva (IL); Dov Rhodes, D.N Misgav (IL); Noam Meyuhas, Jerusalem (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 454 days.

(21) Appl. No.: 14/706,807

(22) Filed: May 7, 2015

(65) Prior Publication Data
US 2015/0244182 A1 Aug. 27, 2015

Related U.S. Application Data

(63) Continuation-in-part of application No. 12/883,457, filed on Sep. 16, 2010, now Pat. No. 9,136,734, which
(Continued)

(51) Int. Cl.
H02J 50/10 (2016.01)
H02J 50/80 (2016.01)
(Continued)

(52) U.S. Cl.
CPC ............ H02J 50/80 (2016.02); H01F 38/14 (2013.01); H02J 5/005 (2013.01); H02J 7/0042 (2013.01);
(Continued)

(58) Field of Classification Search
CPC ............ H02J 50/10; H02J 50/12; H02J 50/80
See application file for complete search history.

(56) References Cited

U.S. PATENT DOCUMENTS 3,414,796 A 12/1968 Henquet
3,771,085 A 11/1973 Hojo et al.
(Continued)

FOREIGN PATENT DOCUMENTS

EP 0160990 A2 11/1985
EP 0160990 B1 1/1991
(Continued)

OTHER PUBLICATIONS

Office Action dated Mar. 22, 2013, for Mexican Application MX/a/2011/003088.
(Continued)

Primary Examiner — Fritz M Fleming
(74) Attorney, Agent, or Firm — William Dippert; Laurence Greenberg; Werner Stemer

(57) ABSTRACT

A system and method is disclosed for integrating inductive power outlet functionality to provide power transfer to electrical devices, as an in-surface wireless charging system, embedded into a host such as a furniture item. An inductive power outlet may include a body casing for containing a primary inductor a driving unit and a fastening mechanism. The body casing may have dimensions suitable for introduction into a passageway through a plate of the item of furniture. The fastening mechanism may be utilized to secure the body casing to the plate of the item of furniture.

22 Claims, 17 Drawing Sheets

Related U.S. Application Data is a continuation of application No. PCT/IL2008/001641, filed on Dec. 18, 2008, application No. 14/706,807, which is a continuation of application No. PCT/IL2013/050914, filed on Nov. 6, 2013.

(60) Provisional application No. 61/064,618, filed on Mar. 17, 2008, provisional application No. 61/071,151, filed on Apr. 15, 2008, provisional application No. 61/129,526, filed on Jul. 2, 2008, provisional application No. 61/129,859, filed on Jul. 24, 2008, provisional application No. 61/129,970, filed on Aug. 4, 2008, provisional application No. 61/723,326, filed on Nov. 7, 2012.

(51) Int. Cl.
| | |
|---|---|
| *H02J 5/00* | (2016.01) |
| *H02J 7/02* | (2016.01) |
| *H02J 50/40* | (2016.01) |
| *H02J 50/90* | (2016.01) |
| *H01F 38/14* | (2006.01) |
| *H02J 7/00* | (2006.01) |
| *H01F 27/26* | (2006.01) |
| *H01F 27/36* | (2006.01) |

(52) U.S. Cl.
CPC ............... *H02J 7/02* (2013.01); *H02J 7/025* (2013.01); *H02J 50/10* (2016.02); *H02J 50/40* (2016.02); *H02J 50/90* (2016.02); *H01F 27/266* (2013.01); *H01F 27/365* (2013.01); *H01F 2038/143* (2013.01); *Y10T 29/4902* (2015.01); *Y10T 307/766* (2015.04)

(56) References Cited

U.S. PATENT DOCUMENTS

| | | | |
|---|---|---|---|
| 3,938,018 A | 2/1976 | Dahl | |
| 4,160,193 A | 7/1979 | Richmond | |
| 4,349,814 A | 9/1982 | Akehurst | |
| RE31,524 E | 2/1984 | Hoebel | |
| 4,431,948 A | 2/1984 | Elder et al. | |
| 4,580,062 A | 4/1986 | MacLaughlin | |
| 4,754,180 A | 6/1988 | Kiedrowski | |
| 4,977,515 A | 12/1990 | Rudden et al. | |
| 5,221,877 A | 6/1993 | Falk | |
| 5,278,771 A | 1/1994 | Nyenya | |
| 5,367,242 A | 11/1994 | Hulman | |
| 5,455,466 A | 10/1995 | Parks et al. | |
| 5,455,467 A | 10/1995 | Young | |
| 5,486,394 A | 1/1996 | Stough | |
| 5,528,113 A | 6/1996 | Boys et al. | |
| 5,550,452 A | 8/1996 | Shirai et al. | |
| 5,600,225 A | 2/1997 | Goto | |
| 5,680,035 A | 10/1997 | Haim et al. | |
| 5,713,939 A | 2/1998 | Nedungadi et al. | |
| 5,734,254 A | 3/1998 | Stephens | |
| 5,762,250 A | 6/1998 | Carlton et al. | |
| 5,821,728 A | 10/1998 | Schwind | |
| 5,821,731 A | 10/1998 | Kuki et al. | |
| 5,907,285 A | 5/1999 | Toms et al. | |
| 5,929,598 A | 7/1999 | Nakama et al. | |
| 5,949,214 A | 7/1999 | Broussard et al. | |
| 6,042,005 A | 3/2000 | Basile et al. | |
| 6,127,799 A | 10/2000 | Krishnan | |
| 6,211,649 B1 | 4/2001 | Matsuda | |
| 6,230,029 B1 | 5/2001 | Hahn et al. | |
| 6,396,935 B1 | 5/2002 | Makkonen | |
| 6,436,299 B1 | 8/2002 | Baarman et al. | |
| 6,441,589 B1 | 8/2002 | Frerking et al. | |
| 6,484,260 B1 | 11/2002 | Scott et al. | |
| 6,532,298 B1 | 3/2003 | Cambier et al. | |
| 6,586,909 B1 | 7/2003 | Trepka | |
| 6,624,616 B1 | 7/2003 | Frerking et al. | |
| 6,644,557 B1 | 11/2003 | Jacobs | |
| 6,673,250 B2 | 1/2004 | Kuennen et al. | |
| 6,721,540 B1 | 4/2004 | Kayakawa | |
| 6,731,071 B2 | 5/2004 | Baarman | |
| 6,766,040 B1 | 7/2004 | Catalano et al. | |
| 6,803,744 B1 | 10/2004 | Sabo | |
| 6,825,620 B2 | 11/2004 | Kuennen et al. | |
| 6,888,438 B2 | 5/2005 | Hui et al. | |
| 6,894,457 B2 | 5/2005 | Germagian et al. | |
| D519,275 S | 4/2006 | Shertzer | |
| 7,043,060 B2 | 5/2006 | Quintana | |
| 7,126,450 B2 | 10/2006 | Baarman et al. | |
| 7,132,918 B2 | 11/2006 | Baarman et al. | |
| 7,164,255 B2 | 1/2007 | Hui | |
| 7,180,248 B2 | 2/2007 | Kuennen et al. | |
| 7,180,265 B2 | 2/2007 | Naskali et al. | |
| 7,224,086 B2 | 5/2007 | Germagian et al. | |
| 7,233,319 B2 | 6/2007 | Johnson et al. | |
| D553,852 S | 10/2007 | Brandenburg | |
| 7,278,310 B1 | 10/2007 | Rice | |
| 7,385,357 B2 | 6/2008 | Kuennen et al. | |
| 7,392,068 B2 | 6/2008 | Dayan et al. | |
| 7,405,535 B2 | 7/2008 | Frerking et al. | |
| 7,462,951 B1 | 12/2008 | Baarman | |
| D586,809 S | 2/2009 | Jones et al. | |
| 7,518,267 B2 | 4/2009 | Baarman | |
| 7,522,878 B2 | 4/2009 | Baarman | |
| 7,576,514 B2 | 8/2009 | Hui | |
| D599,735 S | 9/2009 | Amidei et al. | |
| D599,736 S | 9/2009 | Ferber et al. | |
| D599,737 S | 9/2009 | Amidei et al. | |
| D599,738 S | 9/2009 | Amidei et al. | |
| D603,603 S | 11/2009 | Laine et al. | |
| 7,612,528 B2 | 11/2009 | Baarman et al. | |
| D607,879 S | 1/2010 | Ferber et al. | |
| D611,407 S | 3/2010 | Webb | |
| D611,408 S | 3/2010 | Ferber et al. | |
| 8,049,370 B2 | 11/2011 | Azancot | |
| 8,061,864 B2 * | 11/2011 | Metcalf | H02J 50/10 362/127 |
| 8,421,407 B2 * | 4/2013 | Johnson | H02J 50/10 320/108 |
| 8,810,071 B2 * | 8/2014 | Sauerlaender | H02J 50/10 307/104 |
| 9,325,386 B2 * | 4/2016 | Abe | H04B 5/0037 |
| 9,369,004 B2 * | 6/2016 | Malmberg | H02J 50/10 |
| 9,438,070 B2 * | 9/2016 | Byrne | H02J 50/10 |
| 2002/0057584 A1 | 5/2002 | Brockmann | |
| 2002/0158512 A1 | 10/2002 | Mizutani et al. | |
| 2003/0210106 A1 | 11/2003 | Cheng et al. | |
| 2004/0023633 A1 | 1/2004 | Gordon | |
| 2004/0195767 A1 | 10/2004 | Randall | |
| 2004/0203537 A1 | 10/2004 | Yoshida et al. | |
| 2004/0242264 A1 | 12/2004 | Cho | |
| 2004/0261802 A1 | 12/2004 | Griffin et al. | |
| 2005/0007067 A1 | 1/2005 | Baarman et al. | |
| 2005/0083020 A1 | 4/2005 | Baarman | |
| 2005/0130593 A1 | 6/2005 | Michalak | |
| 2005/0164636 A1 | 7/2005 | Palermo et al. | |
| 2005/0169506 A1 | 8/2005 | Fenrich et al. | |
| 2005/0189910 A1 | 9/2005 | Hui | |
| 2005/0192062 A1 | 9/2005 | Michkle et al. | |
| 2005/0233768 A1 | 10/2005 | Guo et al. | |
| 2006/0028176 A1 | 2/2006 | Tang et al. | |
| 2006/0043927 A1 | 3/2006 | Beart et al. | |
| 2006/0052144 A1 | 3/2006 | Seil et al. | |
| 2006/0061325 A1 | 3/2006 | Tang et al. | |
| 2006/0071632 A1 | 4/2006 | Ghabra et al. | |
| 2006/0091222 A1 | 5/2006 | Leung et al. | |
| 2006/0093132 A1 | 5/2006 | Desormiere et al. | |
| 2006/0202665 A1 | 9/2006 | Hsu | |
| 2007/0023559 A1 | 2/2007 | Scapillato et al. | |
| 2007/0057763 A1 | 3/2007 | Blattner et al. | |
| 2007/0076459 A1 | 4/2007 | Limpkin | |
| 2007/0103110 A1 | 5/2007 | Sagoo | |
| 2007/0136593 A1 | 6/2007 | Plavcan et al. | |
| 2007/0165371 A1 | 7/2007 | Brandenburg | |
| 2007/0182367 A1 | 8/2007 | Partovi | |

(56) References Cited

U.S. PATENT DOCUMENTS

| | | |
|---|---|---|
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Joen et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0257259 A1 | 10/2009 | Leibovitz |
| 2009/0273891 A1 | 11/2009 | Peiker |
| 2009/0278494 A1 | 11/2009 | Randall |
| 2010/0007021 A1 | 1/2010 | Choo et al. |
| 2010/0025940 A1 | 2/2010 | Uchida et al. |
| 2010/0039066 A1 | 2/2010 | Yuan et al. |
| 2010/0066176 A1 | 3/2010 | Azancot et al. |
| 2010/0072825 A1 | 3/2010 | Azancot et al. |
| 2010/0073177 A1 | 3/2010 | Azancot et al. |
| 2010/0181841 A1 | 7/2010 | Azancot et al. |
| 2010/0194336 A1 | 8/2010 | Azancot et al. |
| 2010/0219183 A1 | 9/2010 | Azancot et al. |
| 2010/0219693 A1 | 9/2010 | Azancot et al. |
| 2010/0219697 A1 | 9/2010 | Azancot et al. |
| 2010/0219698 A1 | 9/2010 | Azancot et al. |
| 2010/0244584 A1 | 9/2010 | Azancot et al. |
| 2010/0253282 A1 | 10/2010 | Azancot et al. |
| 2010/0257382 A1 | 10/2010 | Azancot et al. |
| 2010/0327802 A1* | 12/2010 | Sip .............. H02J 50/10 320/108 |
| 2015/0069965 A1* | 3/2015 | Verschueren .......... H02J 50/10 320/108 |
| 2015/0295447 A1* | 10/2015 | Nitz ................ H02J 50/10 320/103 |
| 2017/0317533 A1* | 11/2017 | Byrne ................ H02J 50/12 |

FOREIGN PATENT DOCUMENTS

| | | |
|---|---|---|
| EP | 0558316 A1 | 9/1993 |
| EP | 1990734 A1 | 11/2008 |
| GB | 2399466 A | 9/2004 |
| GB | 2399466 B | 11/2005 |
| GB | 2429372 A | 2/2007 |
| JP | 04-156242 | 5/1992 |
| JP | 07-036556 | 2/1995 |
| JP | 07-039078 | 2/1995 |
| JP | 2001-309579 | 11/2001 |
| JP | 2001309579 | 11/2001 |
| JP | 2005-006440 | 1/2005 |
| JP | 2005-110412 | 4/2005 |
| JP | 2006-102055 | 4/2006 |
| JP | 2007-529110 | 10/2007 |
| WO | 9602879 A1 | 2/1996 |
| WO | 0201557 A1 | 1/2002 |
| WO | 0215320 A1 | 2/2002 |
| WO | 2005041281 A1 | 5/2005 |
| WO | 2005043775 A1 | 5/2005 |
| WO | 2006037972 A1 | 9/2005 |
| WO | 2006015143 A2 | 2/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |

OTHER PUBLICATIONS

Office Action dated Feb. 5, 2013, for Chinese Application 201110068458.7.
Office Action dated May 28, 2013, for Japanese Application 2010-526422.
Office Action dated May 28, 2013, for Japanese Application 2010-528526.
Office Action dated May 21, 2013, for Japanese Application 2011-500345.
International Preliminary Report on Patentability dated Sep. 21, 2010, for Corresponding Application PCT/IL2008/001641.
Liu et al. "An Analysis of Double-layer Electromagnetic Shield for a Universal Contactless Battery Charging Platform", IEEE 2005, p. 1767-1772.
Hui et al. "A New Generation of Universal Contactless Battery Charging Platform for Portable Consumer Electronic Equipment", IEEE Transactions on Power Electronics May 2005, vol. 20, No. 3, p. 620-627.
Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.
Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.
Su et al. "Extended Theory on the Inductance Calculation of Planar Spiral Windings Including the Effect of Double-layer Electromagnetic Shield", IEEE 2007, p. 3022-3028.
Liu et al. "Optimal Design of a Hybrid Winding Structure for Planar Contactless Battery Charging Platform", IEEE Transactions on Power Electronics Jan. 2008, vol. 23, No. 1, p. 455-463.
Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.
International Search Report for PCT/IL2009/000915 Completed by the European Patent Office dated Mar. 15, 2010, 3 Pages.
Search report and Written Opinion for PCT/IL2008/001282, Both completed by the U.S. Patent Office on Feb. 25, 2009, 9 pages all together.
Search Report and Written Opinion for PCT/IL2008/001347, Both completed by the U.S. Patent Office on Feb. 2, 2009, 10 Pages all together.
Search Report and Written Opinion for PCT/IL2008/001348, Both completed by the U.S. Patent Office on Jan. 28, 2009, 9 Pages all together.
International Search Report for PCT/IL2008/01641, Completed by the U.S. Patents and Trademark Office on May 21, 2009, 3 Pages.

* cited by examiner

| Table thickness | Screw length |
|---|---|
| 19mm (3/4") | 30mm |
| 35mm (1.3/8") | 45mm |
| 38.1mm (1. ½") | 50mm |

Fig. 16

EMBEDDED INTERFACE FOR WIRELESS POWER TRANSFER TO ELECTRICAL DEVICES

CROSS-REFERENCE TO RELATED APPLICATIONS

This application is a continuation-in-part of U.S. application Ser. No. 12/883,457 filed Sep. 16, 2010 which is a continuation of PCT Application Ser. No. PCT/IL2008/001641 filed Dec. 18, 2008, which claims the benefit of U.S. Provisional Application Ser. Nos. 61/064,618 filed Mar. 17, 2008, 61/071,151 filed Apr. 15, 2008, 61/129,526 filed Jul. 2, 2008, 61/129,859 filed Jul. 24, 2008 and 61/129,970 filed Aug. 4, 2008. This Application is also a continuation of PCT Application Ser. No. PCT/IL2013/050914 filed Nov. 6, 2013, which claims the benefit of U.S. Provisional Application Ser. No. 61/723,326 filed Nov. 7, 2012. The contents and disclosure of all of the above documents are incorporated herein by reference in their entirety.

TECHNICAL FIELD

The embodiments disclosed herein relate to inductive power outlet system for transferring power to an electric load for wireless charging. In particular the embodiments relate to in-surface wireless mechanisms, embedded in a host, such as household or office furnitures, for providing inductive power transfer to electrical devices.

BACKGROUND

Inductive power coupling, as known in the art, allows energy to be transferred from a power supply to an electric load without connecting wires. A power supply is wired to a primary coil and an oscillating electric potential is applied across the primary coil, thereby inducing an oscillating magnetic field. The oscillating magnetic field may induce an oscillating electrical current in a secondary coil placed close to the primary coil. In this way, electrical energy may be transmitted from the primary coil to the secondary coil by electromagnetic induction without the two coils being conductively connected. When electrical energy is transferred from a primary coil to a secondary coil the coil pair are said to be inductively coupled. An electric load wired in series with such a secondary coil may draw energy from the power source wired to the primary coil when the secondary coil is inductively coupled thereto.

Induction type power outlets may be preferred to the more common conductive power sockets because they provide seamless power transmission and minimize the need for trailing wires.

Wireless power transfer, for example for charging of chargeable devices such as mobile phones, personal entertainment devices, laptop computers and the like, is known in the art. However, such wireless power transfer devices and their trailing power lines may themselves clutter a desktop of a user.

General background may also be found in the following patent application publications: US2010/0073177 Inductive power outlet locator; US2010/0072825 System and method for controlling power transfer across an inductive power coupling; US2010/007021 Efficiency monitor for inductive power transmission; US2009/0257259 Bridge synchronous rectifier; US2010/025940 System and method for inductive power provision over an extended surface; US2010/0257382 Inductive receivers for electrical devices; US2010/0253282 Chargeable inductive power outlet; US2010/0244584 Inductive power providing system having moving outlets; US2010/0219698 Centrally controlled inductive power transmission platform; US2010/0219697 Adjustable inductive power transmission platform; US2010/0219693 System for inductive power provision in wet environments; US2010/0219183 System for inductive power provision within a bounding surface; US2010/0194336 Inductively chargeable audio devices; US2010/0181841 Pinless power coupling; and US2010/0066176 Non-resonant inductive power transmission system and method.

SUMMARY

The mechanism disclosed herein relates to inductive power transfer systems for wireless charging, providing in-surface wireless charging mechanism, embedded in a host such as household or office furniture to provide inductive power transfer to chargeable devices operable in a variety of surfaces.

Aspects of the current disclosure relate to an inductive power outlet configured to transfer power inductively to electric devices placed in proximity an item of furniture. The inductive power outlet may comprise a primary inductor connectable to a power supply via a driving unit. The primary inductor may be operable to couple inductively with a secondary inductor thereby transferring power to an electric load wired thereto.

According to one aspect of the disclosure, an inductive power outlet system for transferring power to an electric load via an inductive power receiver is presented. The inductive power outlet being embedded into a host, and comprising: at least one outlet unit comprising at least one primary inductor unit and at least one driver unit; at least one outlet-host interface unit comprising a host coupler configured to couple the interface unit to the host, and an outlet coupler configured to couple the interface unit to the at least one outlet unit; at least one authentication mechanism configured to prevent unauthenticated outlet units from interfacing with the at least one outlet-host interface; and at least one power supply unit connectable to the driver unit.

Accordingly, the at least one authentication mechanism of the inductive power outlet system comprises a mechanical element. Optionally or additionally, the at least one authentication mechanism comprises an electrical contact.

Additionally or alternatively, the authentication mechanism of the inductive power outlet system is configured to transmit an authentication signal to allow operability of said driver unit.

The inductive power outlet system, further comprising an indicator light operable to indicate when said at least one outlet unit is actively transferring power to the electrical load. The indicator light is further capable of indicating outlet location on the host.

Where appropriate, the inductive power outlet system, the host coupler comprises a fastening mechanism for securing the at least one outlet-host interface unit to said host.

A further aspect of the disclosure is to present an outlet-host interface unit for coupling an outlet unit with a host, the outlet unit for enabling inductive power transfer to an electric load via an inductive power receiver, the outlet-host interface unit for embedding the inductive power outlet unit into a host, the outlet-host power interface comprising: at least a host coupler configured to couple the outlet-host interface unit to the host; at least an outlet coupler configured to couple the outlet-host interface to the outlet unit; and at least one authentication mechanism configured to prevent unauthenticated outlet units from interfacing with the outlet-host interface unit.

Where appropriate, the outlet-host interface unit further comprising at least one indicator light operable to indicate when the inductive power outlet unit is actively transferring power to the electrical load.

Where appropriate, the outlet-host interface unit further comprising a casing body having dimensions suitable for introduction into a cavity within the host; and a fastening mechanism for securing the casing body to the host.

Additionally or alternatively, the outlet-host interface unit further comprising a casing body comprising: a sleeve having a substantially circular cross-section; and a first cover, wherein the first cover is configured to lie substantially flush with an outer surface of the host.

Where appropriate, the outlet-host interface unit, further comprising a filler unit configured to attach to an underside of the sleeve thereby closing the casing body.

Optionally, the casing body of the outlet-host interface unit is molded into the host.

Where appropriate, the outlet-host interface unit is configured to support a primary inductor of the outlet unit at a minimum distance from an outer surface of the host. Optionally, the minimum distance is at least four millimeters.

Accordingly, the authentication mechanism of the outlet-host interface unit is further configured to communicate an identification code, where the identification code uniquely identifies at least one of the hosts, a manufacturer of the host and an owner of the host.

According to another aspect of the disclosure an outlet unit is presented for transferring power to an electric load via an inductive power receiver, the outlet unit configured to be embedded into a host via an outlet-host interface unit, wherein the outlet unit comprises: at least one interface coupler configured to couple to the outlet-host interface unit; at least one primary inductor unit; and at least one outlet authentication element configured to couple with a corresponding interface authentication element of the outlet-host interface such that the outlet unit is authenticated.

The inductive power outlet unit, further comprising at least one driver unit inserted and connectable to the at least one primary inductor unit; wherein the at least one driver unit is operable to communicate with the interface authentication element associated with the interface unit. Further, where appropriate the at least one driver unit is operable to render at least one indicator light operable to indicate when the inductive power outlet unit is actively transferring power to an electrical load.

Additionally, the at least one driver unit of the inductive power outlet unit is connectable to a power supply unit.

It is an additional aspect of the current disclosure to teach a method for manufacturing an in-surface inductive power outlet for transferring power to an electric load via an inductive power receiver. The method may comprise: providing a host having a subsurface docking cavity; coupling an outlet-host interface unit to the docking cavity; obtaining an outlet unit; and coupling the outlet unit to the outlet-host interface unit.

Optionally, the step of coupling an outlet-host interface unit to the docking cavity comprises molding the outlet-host interface to the host.

Where appropriate, wherein referencing the step of providing a host having a subsurface docking cavity, comprises: making a docking cavity having a form factor suitable for accommodating the outlet-host interface unit.

Where appropriate, wherein referencing the step of coupling an outlet-host interface unit to the docking cavity comprises: obtaining an outlet-host interface having a form factor corresponding to the docking cavity; inserting the outlet-host interface into the docking cavity; fastening the outlet-host interface from an underside of the host; and connecting an electrical line to a socket in the outlet-host interface.

Accordingly, the docking cavity comprises a passageway through the host and the outlet-host interface has an outer surface which is substantially flush with outer surface of the host.

Optionally, wherein referencing the outlet unit comprises at least one primary inductor unit.

Optionally, wherein referencing the outlet unit comprises at least one driver unit.

Additionally or alternatively, wherein referencing at least one driver unit is configured to receive remote signals to allow for remote control.

The inductive power outlet may further comprise a body casing for containing at least the primary inductor and the driving unit. The body casing may have dimensions suitable for introduction into a passageway through a plate of the item of furniture. The inductive power outlet may also comprise a fastening mechanism for securing the body casing to the plate of the item of furniture.

Optionally, the body casing comprises: a first cover and a sleeve. The first cover may be configured to lie substantially flush with an outer surface of the plate. In some embodiments, the sleeve may have a substantially circular cross-section.

Variously, the inductive power outlet may comprise a second cover configured to attach to an underside of the sleeve thereby closing the body casing. Optionally, the second cover may comprise an acoustic passageway therethrough.

According to some embodiments, the fastening mechanism may comprise: a securing ring having an inner thread configured to mate with an outer thread of the body casing. Such a fastening mechanism may be configured to secure the body casing to a plurality of the plates having a range of thicknesses.

Further aspects of the disclosure relate to a wireless battery charger embedded in household or office furniture such as a desk, such that its charging surface is flush with the horizontal surface of the furniture such as desktop.

According to an exemplary embodiment of the current disclosure, a wireless charging system embedded in a furniture is provided, the system comprises: a furniture having a substantially horizontal plate having a circular hole; a wireless charger sized to fit into the circular hole such that the upper surface of the wireless charger is substantially flush with upper surface of the plate; and a chargeable device capable or receiving electrical power when placed on the wireless charger.

According to another exemplary embodiment of the current disclosure a wireless charger is provided comprises: a circular body comprising: a top cover; a cylinder having an outer thread; and a bottom cover, forming together a case for holding charging electronics; and a securing ring having an inner thread sized to mate with outer thread of the cylinder, wherein the body is capable of being secured to a circular hole in a furniture plate by the securing ring such that upper surface of the top cover is substantially flush with upper surface of the furniture plate.

According to yet another exemplary embodiment of the current disclosure a method of installing a wireless charger in a furniture the method comprises the steps of: drilling a circular hole of having a diameter suitable for fitting the body of a wireless charger in an exposed substantially horizontal plate of a furniture; inserting the body of a wireless charger from the exposed side of the furniture plate; from the underside of the plate, fastening a securing ring such that upper surface of the wireless charger is substantially flush with upper surface of the plate; and from underside of the plate, connecting an electrical cable to a socket in the wireless charger, and plugging the other side of the electrical cable to a household electric outlet.

The method may further comprise charging a chargeable device by placing it on top of the installed wireless charger such that its receiving coil is substantially aligned with the transmitting coil within the wireless charger.

The terms 'wireless charger' and 'inductive power outlet' are used herein interchangeably. It is particularly noted that a wireless charger may be used to power electronic equipment directly or to charge a power cell as required. Likewise, an inductive power outlet may be used to charge a power cell or to power electronic equipment directly.

The terms 'magnetic unit' and 'primary inductor unit' are used herein interchangeably and may refer to a unit that includes a magnet, a coil, a ferrite shield and a power line.

The term 'driver unit' used herein, may be used interchangeably with the term 'power unit' or 'managed power unit'. It is noted that when the distinction between 'power unit' or 'managed power unit' is of importance, the appropriate term will be used.

Unless otherwise defined, all technical and scientific terms Used herein have the same meaning as commonly understood by one of ordinary skill in the art to which this disclosure belongs. Although methods and materials similar or equivalent to those described herein can be used in the practice or testing of the present disclosure, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current disclosure or its embodiments.

BRIEF DESCRIPTION OF THE DRAWINGS

For a better understanding of the disclosure and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments of the present disclosure only, and are presented in the cause of providing what is believed to be the most useful and readily understood description of the principles and conceptual aspects of embodiments of the disclosure. In this regard, no attempt is made to show structural details in more detail than is necessary for a fundamental understanding of the embodiments; the description taken with the drawings making apparent to those skilled in the art how the several forms of the disclosure may be embodied in practice. In the accompanying drawings:

FIG. 16 shows a data table showing examples of the screw length in comparison to the table thickness.

DETAILED DESCRIPTION

Figure 1A:
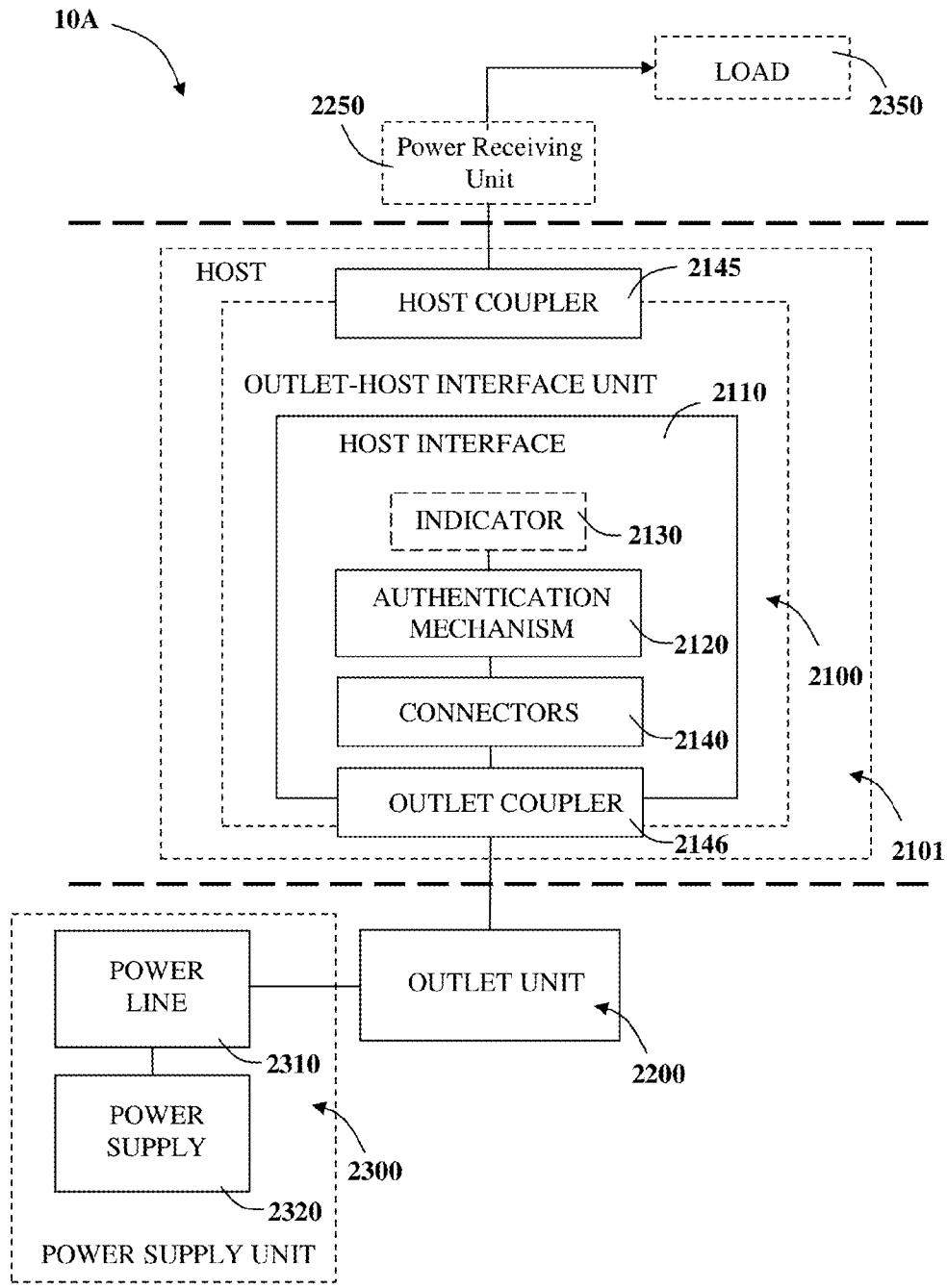
FIG. 1A is a block diagram schematically representing selected components of a possible in-surface inductive power transfer system including an embedded hosting component.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The current disclosure of in-surface wireless power systems offer a mechanism to optimize and enable a surface for wireless power transfer and for charging mobile devices or other worktop electrical devices. This may be achieved by providing a flush-fitted, seamless, or invisible assembly suitable for a variety of hosts.

Aspects of the present disclosure relate to host outlet interfacing for inductive power transmission systems for electrical devices, such as mobile telephones, tablet computers, laptops and the like. In particular the embodiments relate to a host outlet interfacing unit and various functional units which may be coupled thereto. The host outlet interfacing unit may be embedded in a surface at home, office or public areas such as top of a desk, bedside furniture, coffee shop tables, public transportation shelves and the like. The functional units may provide the electrical components such as inductive coils, driving units, communication elements and the like as described hereinafter.

Possible System Configurations:

The in-surface mechanism for wireless power transfer may be provided by various configurations, allowing quick and easy assembly by adding various functional components. The functional components attached to the outlet-host interface unit may enable the surface to be classified as a wireless power transfer ready surface, for example when the interface is provided or only some of the functional units such as the magnetic unit are provided. Where all the required functional components are provided a surface may provide full power transfer functionality.

The in-surface mechanism for wireless power transfer architecture may provide a basic structure to support a two piece unit which combines seamless integration with the surface and easy system configuration and maintenance. The system may be comprised of two part solution: an in-surface primary inductor unit (the magnetic unit) providing primary inductors such as inductive coils for energy transfer, ferromagnetic flux guides and the like, as well as a driver unit (the wireless power unit) for managing energy generation and transfer. Where appropriate, the driver unit may also be managed and maintained remotely through wireless power network management system.

The in-surface mechanism for wireless power transfer may be provided in various architectures, allowing for a staged build, such as:

In-surface hosting unit only (such as described in FIG. 2A hereinafter).

In-surface hosting unit with an inductive outlet unit (including the magnetic unit only)—inductively enabled surface (such as described in FIG. 2B hereinafter).

In-surface hosting unit with an inductive outlet unit (including a magnetic unit and a wireless power unit)—wireless charging transmitter unit (such as described in FIG. 2C hereinafter).

In-surface hosting unit with an inductive outlet unit (including a magnetic unit and a managed power unit)—wireless power network, remotely managed unit (such as described in FIG. 2D hereinafter).

It is noted that the above described configurations of the in-surface mechanism for wireless power transfer configurations are shown by way of illustrative and non-limiting examples.

Figure 1B:
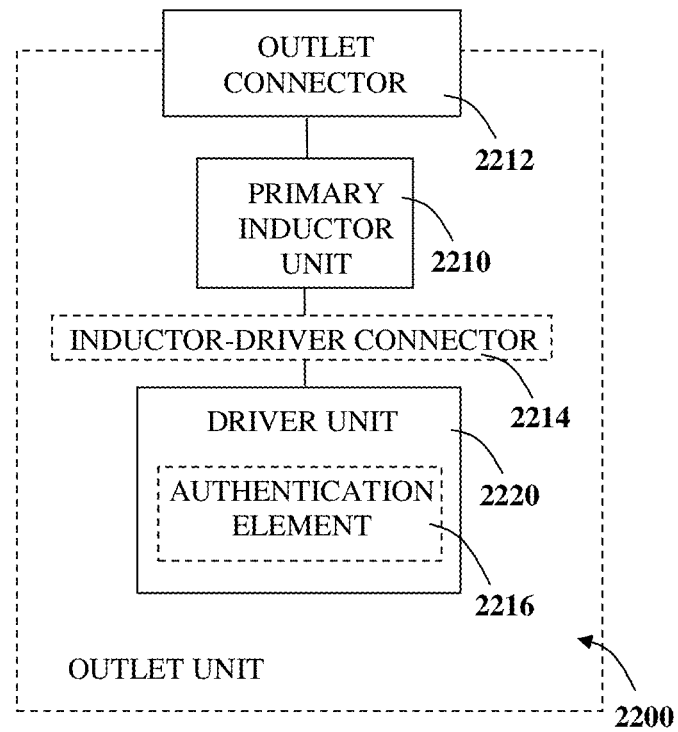
FIG. 1B is a block diagram schematically representing selected components of an outlet unit for connecting to an in-surface inductive power transfer system.
Figure 1C:
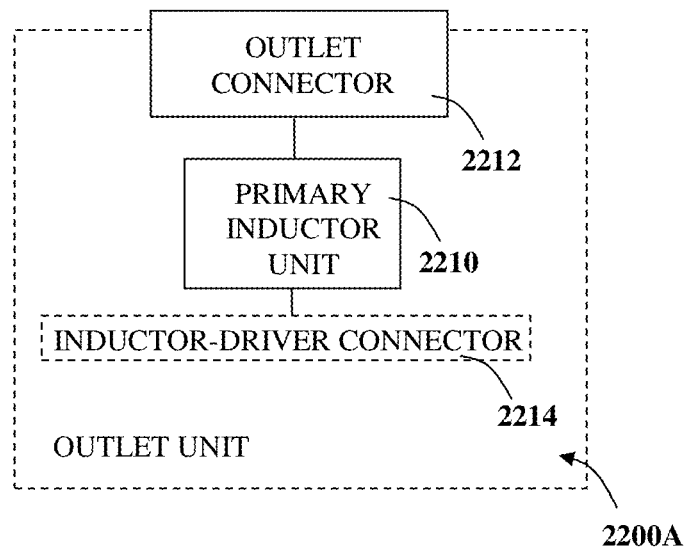
FIG. 1C is a block diagram schematically representing selected components of another possible configuration of an outlet unit for connecting to an in-surface inductive power transfer system.

Reference is now made to the block diagram of FIG. 1A, representing a possible arrangement of selected elements of an inductive power transfer system, and block diagrams of FIG. 1B and FIG. 1C representing possible outlet unit configurations for use with an embedded hosting unit. It is noted that the disclosure is not limited to these configurations.

With particular reference to the block diagram of FIG. 1A, selected elements are represented of an in-surface mechanism 10A for wireless power transfer, in a basic hosting configuration. The in-surface mechanism 10A includes an outlet-host interface unit 2100 for interfacing between functional units and the host surface. The mechanism 10A is configured to become functionally operable when the outlet unit 2200 is appropriately configured to include various functional units such as a magnetic unit, an inductor unit, a driver unit, a power unit and the like, which may be coupled to the outlet-host interface unit 2100 via an outlet coupler, to allow full wireless power transfer functionality.

It is particularly noted that the outlet-host interface unit 2100 may enable the host surface to become a wireless power transfer ready surface. This may promote the provision of local wireless charging, for example, in the home or office and may further be configured to provide remote wireless charging management or wireless network management.

It is also noted that the outlet-host interface unit might be incorporated into various prefabricated materials and integrated into host working surfaces such as workshop sections, plasterboard, fitted cabinets, counter shelves, desks, coffee tables, various furniture items and the like.

The in-surface mechanism 10A of FIG. 1A includes an embedded outlet-host interface unit 2100, an inductive power outlet unit 2200, and a power supply unit 2300 configured for embedding into a surface to provide wireless power transfer to an inductive power receiver unit 2250. Accordingly, surfaces in a various environments such as the home environment, the office, factory, laboratory, workshops, restaurants, cafes and various public areas may be readily enhanced with wireless power transfer functionality. Such a system may, for example, provide a wireless charging hotspot for a chargeable device such as a mobile phone, a personal entertainment device such as MP3 or iPod, a laptop computer, a PDA (Personal Digital Assistant), a tablet computer or the like.

The in-surface mechanism 10A may include various elements such as an outlet-host interface unit 2100, a host interface 2110, an authentication mechanism 2120, optionally an indicator 2130, a set of connectors 2140, a host coupler 2145 and an outlet coupler 2146.

The power receiver unit 2250 (shown for clarity) is configured to power an electrical load 2350 and may incorporate elements such as a secondary inductor (not shown), an electrochemical cell (not shown) and the like. It is noted that the power receiver unit of 2250 is presented in FIG. 1A in order to better illustrate the use of the current disclosure. It will be appreciated that various wireless power receivers may be used with such a wireless power transfer system.

The power supply unit 2300 includes a power supply 2310 such as a mains line or a vehicle battery, for example, connected via a power line 2320 to provide power to the outlet-host interface unit 2100 and the outlet unit 2200.

It is noted that the current disclosure assembly illustrates possible non-limiting installations of an inductive power outlet unit comprising various functional units such as a driver unit, a power unit, a primary inductor unit, a magnetic unit, a flux guidance unit, an electromagnetic unit, a ferromagnetic unit, a communications unit, an authentication unit or the like. Accordingly, the inductive outlet unit may enable power to be transferred to the power receiving unit 2250 thereby charging the power cell or controlling the transfer of power to the load 2350 and to manage communication with the power receiving unit 2250.

It is a particular feature of embodiments of the interface module that it may be operable to transfer power to a power receiving unit 2250 or to control the transfer of power to the load 2350 and to manage communication between the power receiving unit 2250 and the inductive power outlet 2200. Accordingly, in various embodiments the embedded hosting unit 2100 may be configured to perform a variety of functions including, but not limited to: providing a wireless charging ready surface, providing a wireless charging transmitting unit, and providing a remotely managed wireless power network.

It is noted that the authentication mechanism 2120 may be configured to prevent unauthenticated outlet units from coupling with the outlet-host interface unit 2110, for example by disconnecting the driving unit 2220 if an unauthenticated outlet unit is coupled thereto. The authentication mechanism 2120 may include an outlet authentication element 2216 (FIG. 1B) configured to couple with a corresponding interface authentication element of the outlet-host interface unit such that the outlet unit is authenticated.

The authentication may use chip-unique challenge-response pairs or any chip-based technology such as Near Field Communication (NFC), Chip Authentication Program (CAP), combinations thereof and the like.

NFC-based authentication mechanism may allow the chip to be interrogated and for an identification code to be read therefrom.

Chip Authentication Program (CAP), is a specification that provides mechanisms for customer authentication and is a form of two-factor authentication.

The authentication mechanism 2120 may further be configured to communicate an identification code, where the identification code uniquely identifies the host, a manufacturer of the host and the owner of the host. It will be appreciated that the identification code may allow a power management system or network identify the host into which the outlet is embedded.

Optionally, the authentication mechanism 2120 comprises a mechanical element. Such mechanical element may be used to secure the element in place and perform service options, such as disconnection when authentication fails, for example. Additionally or alternatively, the authentication mechanism 2120 comprises electrical contacts. Such electrical contacts may be used to provide power and may further enable disconnection of the driver unit, if authentication fails, for example. Accordingly, the authentication mechanism 2120 is configured to transmit an authentication signal to allow operability of the driver unit, and, where appropriate disconnect the driver unit, if authentication fails, for example. Optionally, a mechanical element may further provide an encoded identification code.

The outlet-host interface unit 2110 is provided to couple the outlet unit to the host. Accordingly outlet-host interface unit 2110 includes an outlet coupler 2146 for coupling with the outlet unit 2200 and a host coupler 2145 for coupling with the host 2101 or the host interface 2110, such as a prefabricated material. Coupling may be mechanical, electrical or the like as well as combinations thereof. Where appropriate, it is noted that the outlet-host interface unit 2110 may be plugged with a filler unit to prevent damage or avoid other possible usages of the wireless charging ready surface.

Reference is now made to FIG. 1B which shows a block diagram representing selected components of a possible outlet unit 2200 operable to couple to a host via an embedded outlet-host interface unit 2100 (FIG. 1A). The outlet unit 2200 includes a primary inductor unit 2210, a driver unit 2220 and an outlet connector 2212 configured to couple with the embedded outlet-host interface unit 2100 (FIG. 1A) through the outlet coupler 2146 (FIG. 1A) to provide wireless power transfer. Accordingly, the driver unit 2220 is configured to provide an oscillating driving voltage to the primary inductor 2210.

Optionally, the primary inductor unit 2210 may be configured to connect with the driver unit 2220 through an inductor-driver connector 2214.

Optionally, the driver unit 2220 of the outlet unit 2200 is configured with an authentication element 2216 operable to communicate and couple with the corresponding interface authentication element of the authentication mechanism 2120 (FIG. 1A) of the embedded outlet-host interface unit 2100 (FIG. 1A), such that the outlet unit 2200 is authenticated to allow wireless power transfer.

It is noted that the driver unit 2220, when coupled with the primary inductor unit 2210, forms a wireless charging transmitter unit (FIG. 2C) to provide power transfer to a load.

It is further noted that the driver unit 2220 may be configured as a managed power unit (FIG. 2D) to provide a wireless power network system, remotely managed.

It is also noted that the primary inductor unit 2210 may be wired, via a driving unit 2220 through the set of internal connectors to a power supply unit 2300 (FIG. 1A).

Reference is now made to FIG. 1C which shows a block diagram representing selected components of another possible configuration of an outlet unit 2200A operable to connect with an in-surface embedded hosting unit 2100 (FIG. 1A), including a primary inductor unit 2210 and an outlet connector 2212 configured to couple with the in-surface embedded hosting unit 2100 (FIG. 1A) through the outlet coupler 2146 (FIG. 1A) to provide a wireless power transfer ready surface.

It is noted that the primary inductor unit 2210 may be configured to connect with the driver unit 2220 through an inductor-driver connector 2214 or the like, to provide a wireless power transmitting unit (FIG. 2C) or to provide a managed power unit (FIG. 2D) to provide a wireless power network system, remotely managed, if driver unit 2220 supports network management options.

Figure 1D:
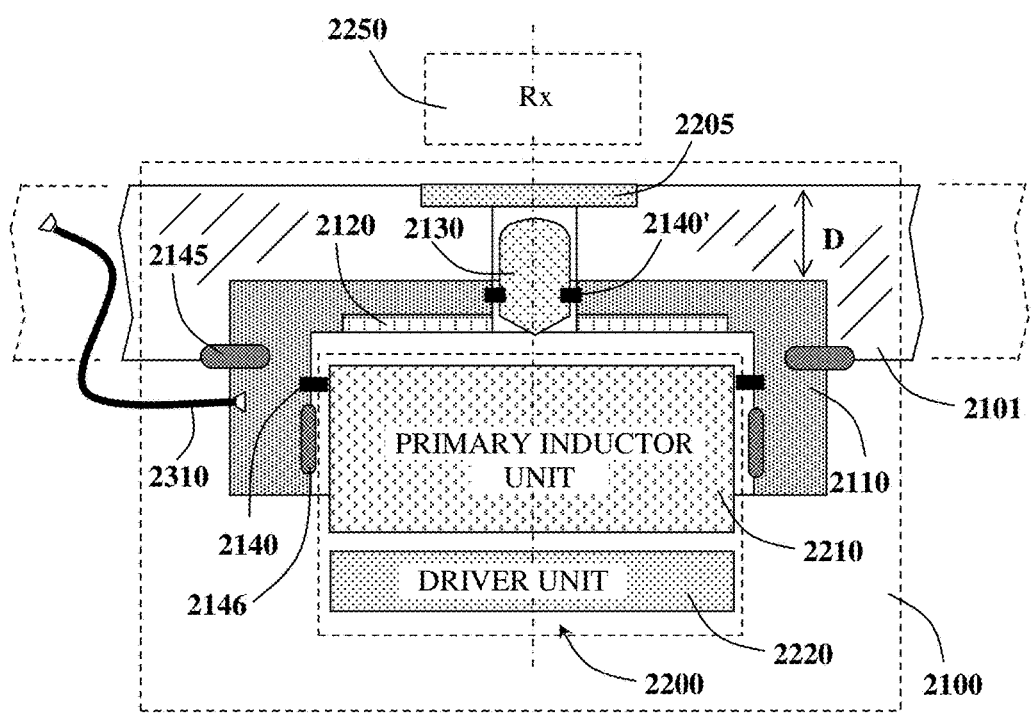
FIG. 1D schematically represents an assembly representing a possible configuration of the main components of the in-surface inductive power transfer system.

Reference is now made to FIG. 1D schematically representing selected components of a possible inductive power transfer system 10D embedded into a host 2101. The system 10D, includes an outlet-host interface unit 2110, an inductive power outlet unit 2200, and a power line unit 2310 connected to power supply such as the mains or an electrical battery. The system 10D is operable to provide power to an inductive charging enabled power receiver unit 2250.

It is a particular feature of the hosting unit 2100 that it is configured for embedding into a host surface 2101. The embedded hosting unit 2100 includes an outlet-host interface unit 2110, an authentication mechanism 2120, an indicator 2130, a host coupler 2145, an outlet coupler 2146 and a set of connectors 2140. The connectors 2140 may provide conductive connection for an electrical power line to the power outlet unit 2200. Accordingly, the outlet-host interface unit 2110 may be positioned at a minimum distance D from the outer surface of the host 2101 and configured to support operability of the primary inductor unit 2210. Optionally, the minimum distance D may have a value of at least four millimeters, for example. Alternatively, the minimum distance may have a value of one millimeter, two millimeters, three millimeters, five millimeters or more.

Where appropriate, the connectors may additionally or alternatively provide a conductive connecting line to an indicator 2130 via a second set of connectors 2140' such that the indicator 2130 may only be used when an appropriate power outlet unit 2200 is coupled to the outlet-host interface unit 2110.

It is noted that the outlet unit may be coupled to the outlet-host interface unit 2110 via a variety of connectors such as electrical contacts, signal contacts, mechanical contacts and the like. Accordingly, electrical coupling, communication coupling, mechanical coupling and the like may be enabled via the outlet coupler 2146 of the outlet-host interface unit 2110.

The inductive power outlet unit 2200 includes a primary inductor unit 2210, and a driving unit 2220. The primary inductor unit 2210 may be coupled through the outlet coupler 2146 and wired, possibly via the connectors 2140 to the power supply (not shown) via line 2310. The driver unit 2220 may be configured to provide an oscillating driving voltage to the primary inductor 2210.

It is noted that the outlet-host interface unit 2110 may be coupled and tightly secured to the host 2101 by a host coupler 2145 comprising a fastening mechanism, such as bottom support brackets, support pins, support ledges, jutting elements, jutties, projections, protrusions, brackets, ledges, hooks, loops, screw threads and the like which may be configured to interlock with or otherwise couple with corresponding features in the outlet-host interface unit 2110 such as indentations, sockets, feet, clasps, hooks, loops, screw threads or the like. Additionally or alternatively, the host coupler 2145 of the outlet-host interface unit 2110 may be screwed into the host 2101, clicked in tightly or use internal brackets.

Additionally or alternatively, the outlet-host interface unit 2110 comprises a casing body having dimensions suitable for introduction into a cavity within the host surface 2101 and a fastening mechanism for securing the casing body to the host. The casing body may comprise a sleeve having a substantially circular cross-section and a first cover configured to lie substantially flush with the outer surface 2101 the host to form an indicator cover 2205. Such configuration may provide a seamless outer surface to indicate power transfer and a power transfer hotspot (FIG. 5A-B) for locating a power receiving device when power is to be transferred and may also allow for product marketing indications as described hereinafter (FIG. 5D). Optionally, the casing body of the outlet-host interface unit is prefabricated and molded into the host 2101.

Optionally, the host coupler 2145 of the outlet-host interface unit 2110 may be fastened to the host 2101 via teeth situated upon the circumference of the outlet-host interface unit 2110 and wedged against an appropriate grooves in the host 2101.

It is further noted that the form factor of the dock within the host 2101 may be selected such that only a corresponding outlet-host interface unit 2110 is couplable thereto.

Reference is now made to FIG. 2A-D schematically showing the various possible configurations of inductive power transfer system for embedding within a host using an outlet-host interface unit.

The in-surface host interfacing unit may be connected to various functional units such as a wireless power transfer unit, a magnetic unit, a primary inductor unit, or the like as described herein to create a wireless charging transmitter unit. The in-surface host interfacing unit may enable wireless power transfer for example for charging low power devices such as mobile phones, handsets, music players, Bluetooth devices, tablet computers, laptop computers and more. Furthermore, higher power electrical devices may be powered via such units, such as worktop tools such as kitchen appliances, blenders, mixers, food processors, irons, toasters, coffee makers, drills, saws, soldering irons and the like. The in-surface host interfacing embedded mechanism is suitable for use in residential locations of home, workplace, laboratory, factory, office, restaurants, cafes, airport lounges, sports arenas, and the like as well as various public areas.

Figure 2A:
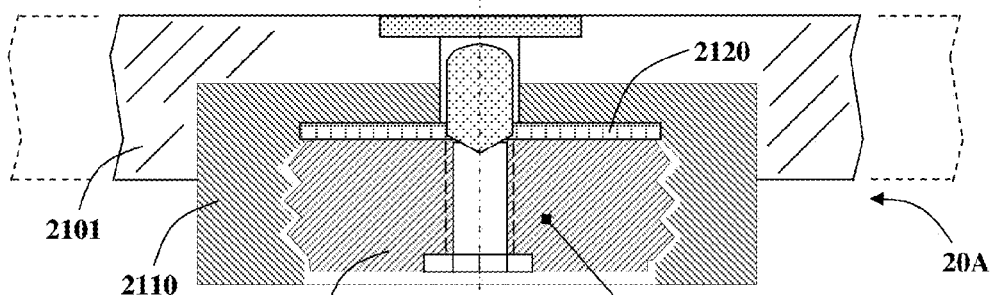
FIG. 2A schematically shows a first configuration of an outlet-host interface unit for an in-surface inductive power transfer system with a coupled filler unit.

Referring now to FIG. 2A, schematically showing a basic configuration of an in-surface inductive power transfer mechanism 20A with a filler unit, the in-surface wireless power transfer mechanism 20A may include a host 2101, an outlet-host interface unit 2110, an authentication unit 2120 and a filler unit 2150.

Figure 2B:
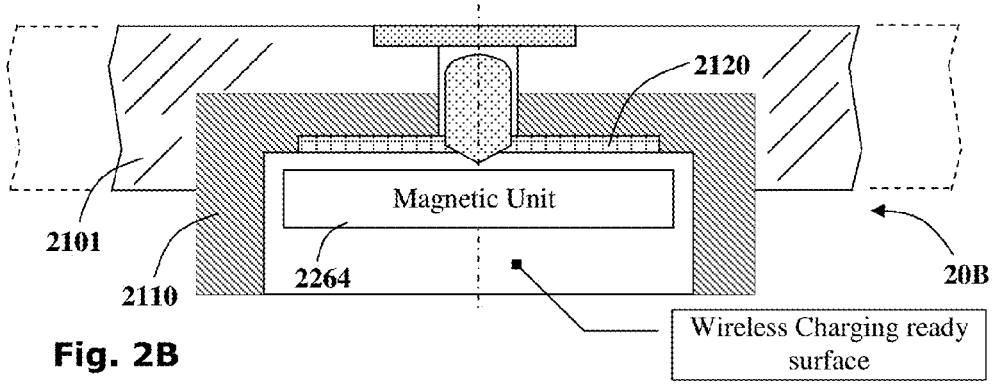
FIG. 2B schematically shows another possible configuration of an outlet-host interface unit for an in-surface inductive power transfer system with a coupled magnetic unit.
Figure 2C:
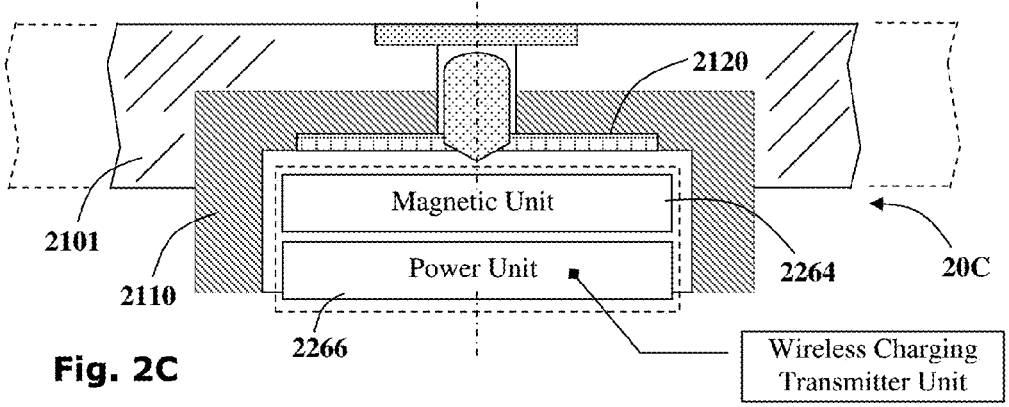
FIG. 2C schematically shows another possible configuration of an outlet-host interface unit for an in-surface inductive power transfer system with coupled magnetic and power units.
Figure 2D:
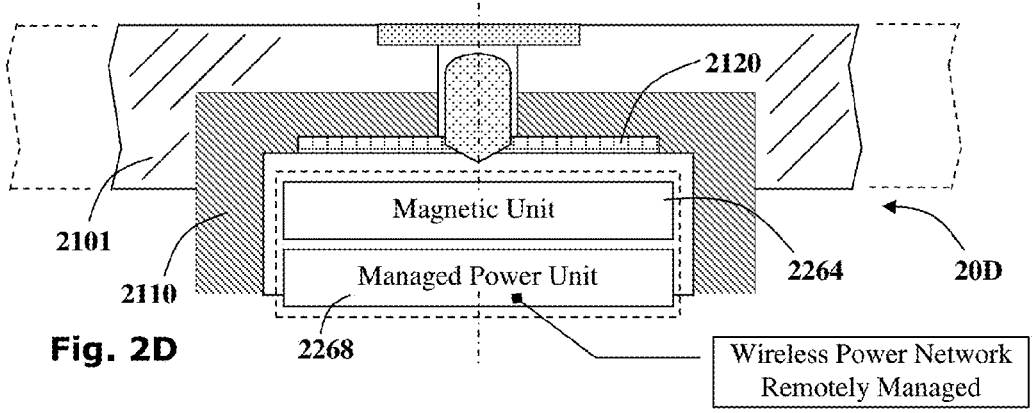
FIG. 2D schematically shows still another possible configuration of a outlet-host interface unit for an in-surface inductive power transfer system with coupled magnetic and managed power units.

It is noted that such configuration may provide the potential to add wireless power transfer functionality after assembly of the hosting unit in situ when adding various types of power units, as described in FIGS. 2B-D.

Referring now to FIG. 2B schematically showing a possible in-surface inductive power transfer mechanism 20B configured with a magnetic unit 2264, the in-surface inductive power transfer mechanism 20B includes a host 2101, an outlet-host interface unit 2110, an authentication unit 2120 and a magnetic unit 2264. Such a configuration may provide a wireless power transfer ready surface and may become fully functional with added components as described in FIGS. 2C-D.

Referring now to FIG. 2C schematically showing a possible in-surface inductive power transfer mechanism 20C configured with a magnetic unit 2264 and a power unit 2266, the in-surface inductive power transfer mechanism 20C includes a host 2101, an outlet-host interface unit 2110, an authentication unit 2120, a magnetic unit 2264 and a power unit 2266. Such a configuration may provide a wireless power transfer transmitter unit and is fully functional in providing charging power to a load. The power unit 2266 may be connected to the magnetics unit 2264 to create a wireless charging transmitter unit.

Referring now to FIG. 2D schematically showing a possible in-surface inductive power transfer mechanism 20D configured with a magnetic unit 2264 and a managed power unit 2268, the in-surface inductive power transfer mechanism 20D includes a host 2101, an outlet-host interface unit 2110, an authentication unit 2120, a magnetic unit 2264 and a managed power unit 2268. Such configuration may provide functionality for a remotely managed wireless power network. The managed power unit 2268 may be connected to a wireless charging magnetics unit 2264 to create a wireless power networked charging remotely managed unit.

It is also noted that any of the various units of FIGS. 2B-D, such as magnetic unit, power unit, managed power unit shown in the examples but also including other functional units such as described herein, may use an outlet coupler configured to couple and tightly secure said functional units to the outlet-host interface unit 2110 by means of fasteners or the like.

Additionally or alternatively, the outlet coupler of the magnetic units, power units and managed power units, may enable to screw said units into the outlet-host interface unit 2110 (FIG. 5A) or snap them into place securely (FIG. 5B), for example.

Additionally, the in-surface mechanism for wireless power transfer may be provided in various architectures, allowing a staged buildup of the modules to provide the required power transfer functionality, as described herein.

Figure 3:
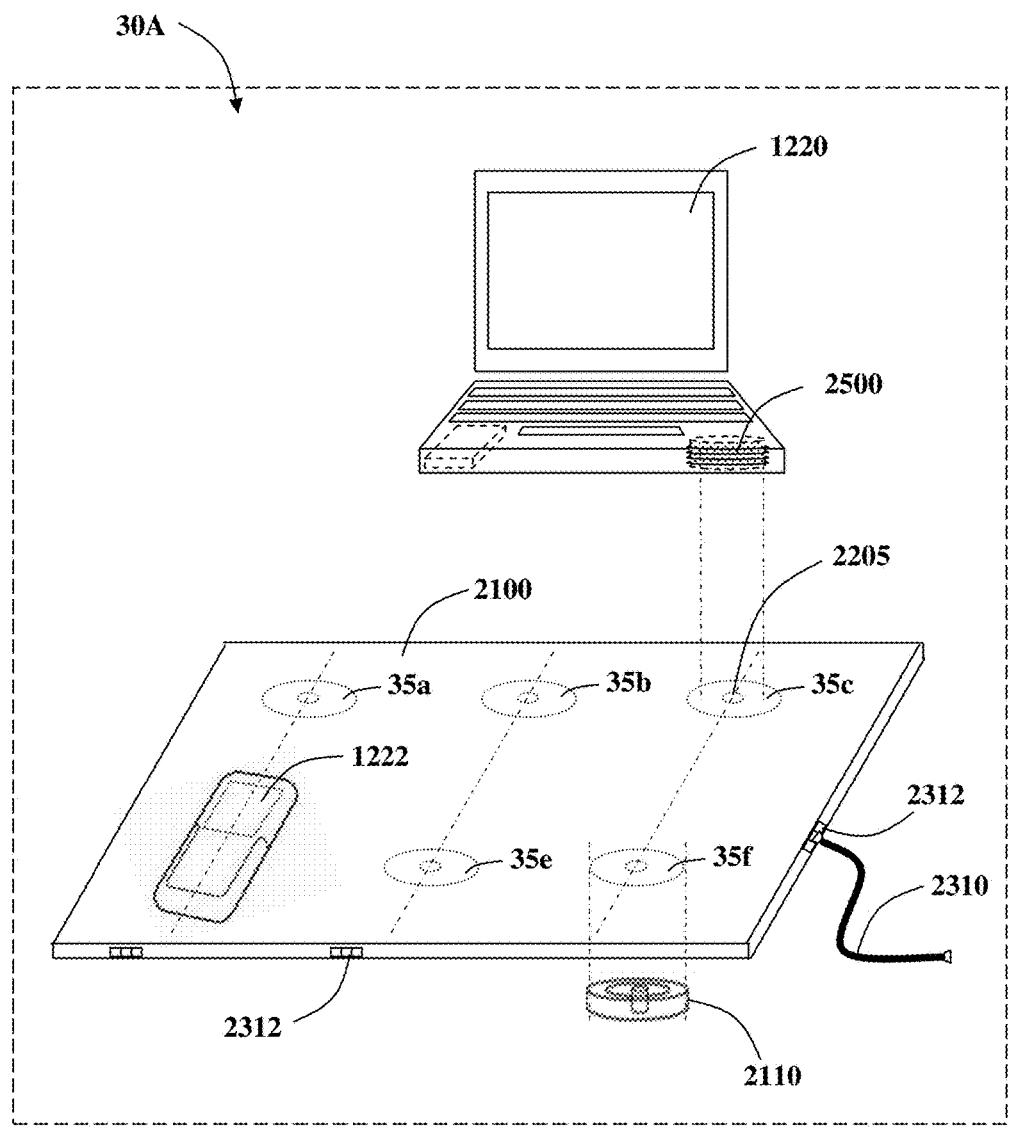
FIG. 3 schematically shows an in-surface wireless power transfer enabled table top used for wirelessly charging chargeable devices according to an exemplary embodiment of the current disclosure.

Reference is now made to FIG. 3 which schematically shows an illustration of an in-surface wireless power transfer mechanism 30A used for wirelessly providing power or charging electrical devices, including a laptop computer 1220 and a smartphone 1222, according to an exemplary embodiment of the current disclosure.

The in-surface wireless power transfer mechanism 30A, which may be a table top, inductive mat or the like, includes the outlet unit 2100, connectable through a plug 2312 to a power supply unit via a power line 2312, a number of embedded inductive power transmitters 35a-f, each with a top cover 2205 and an outlet-host interface unit 2110. The inductive power transmitters 35a-f are configured to transfer power inductively to inductive power receiver 2250 incorporated into various electrical appliances. A laptop computer 1220, may be positioned such that an integrated inductive power receiver 2250 is aligned to a first inductive power transmitter 35c. A smartphone device 1222 may be positioned such that its integrated inductive power receiver 2250 (not shown for clarity) is in alignment with a second inductive power transmitter 35d (not shown for clarity).

Figure 4A:
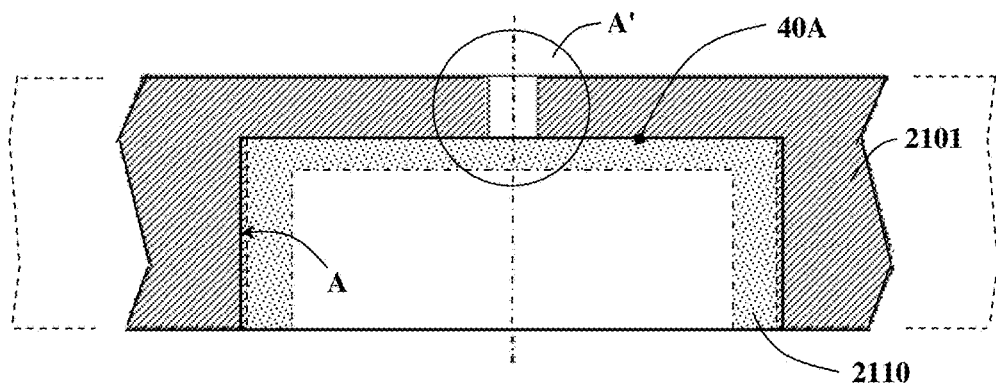
FIGS. 4A-C schematically shows possible cavity configurations of the surface for positioning the outlet-host interface unit.
Figure 4B:
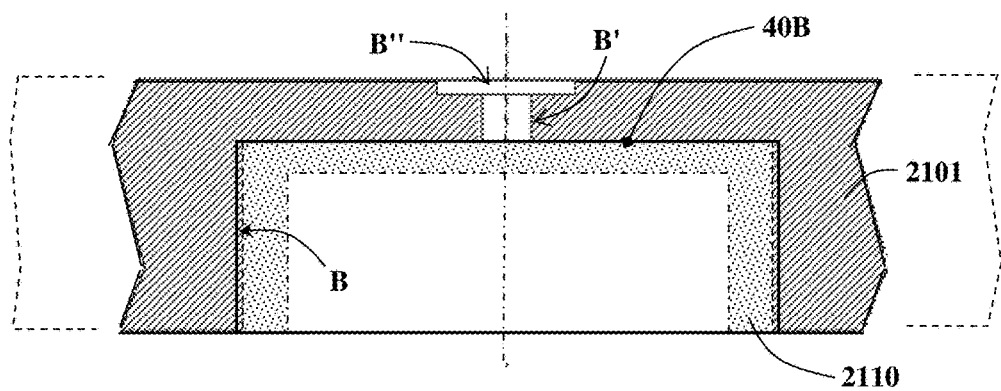
Figure 4C:
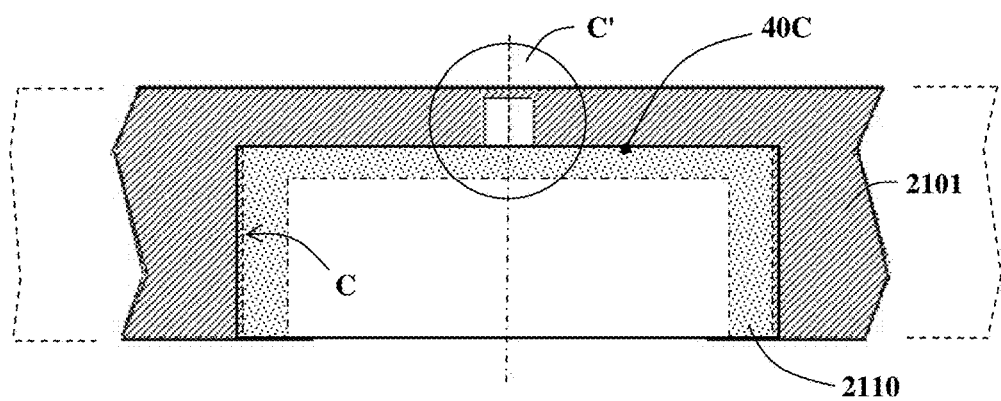

Reference is now made to FIGS. 4A-C schematically showing possible docks within the hosts such as passageways, cavities or holes through or partially through the host (surface) 2101. The docks may be used to accommodate the outlet-host interface unit 2110.

FIG. 4A shows a dock 40A, configured and sized to accommodate a possible cylindrical or near cylindrical body of the outlet-host interface unit 2110. The dock may be drilled or cut from the bottom of the surface 2101 through to the top of the host (surface) 2101. The dock 40A may be a passageway or cavity and may include a lower section (indicated by A) having a first diameter and an upper portion (indicated by A') having a second diameter, having a form factor suitable for accommodating the outlet-host interface unit 2110. The first diameter may be larger than the second diameter to allow for the insertion of the outlet-host interface unit 2110 in the lower section and locate the indicator 2130 (FIG. 1D) in the upper section.

Optionally a mid-section may be introduced (not shown) having a third diameter to enable locating the authentication mechanism 2120 (FIG. 1D).

FIG. 4B shows another dock 40B, configured and sized to accommodate a possible cylindrical body of the outlet-host interface unit 2110, drilled or cut from the bottom of the surface 2101 through to the top of the host (surface) 2101. The passageway or hole 40B may include a lower section (indicated by B) having a first diameter, a mid-section (indicated by B') having a third diameter and an upper portion (indicated by B") having a third diameter.

The first diameter may be larger than the second diameter to allow for the insertion of the outlet-host interface unit 2110 in the lower section. The third diameter may be larger than the second diameter such that a lip is formed to accommodate for an indicator cover 2205 (FIG. 1D), which may be located in the mid-section, covering the indicator 2130 (FIG. 1D) that may be located in the mid-section.

FIG. 4C shows another dock 40C, configured and sized to accept a possible cylindrical body of the outlet-host interface unit 2110, drilled or cut from the bottom of the surface 2101 reaching a pre-configured height below the top surface of the host 2101. The passageway or hole 40C may include a lower section (indicated by C) having a first diameter and an upper section (indicated by C') having a second diameter.

The first diameter may be larger than the second diameter to allow for the insertion of the outlet-host interface unit 2110 in the lower section and locate the indicator 2130 (FIG. 1D) in the upper section.

Although cylindrical docks have been described above for illustrative purposes, it will be appreciated that in various embodiments, the dock (FIG. 4A-C, indicated by 40A, 40B and 40C) may be of a variety of form factors such as circular, rectangular, triangular or a combination thereof.

It is noted that the dock, passageway or hole (FIG. 4A-C, indicated by 40A, 40B and 40C) in the host 2101 may be prefabricated, for example during molding or manufacturing of host 2101. Alternatively, passageway or hole (FIG. 4A-C, indicated by 40A, 40B and 40C) may be drilled or cut into the host 2101, for example using a cup-drill.

Figure 5A:
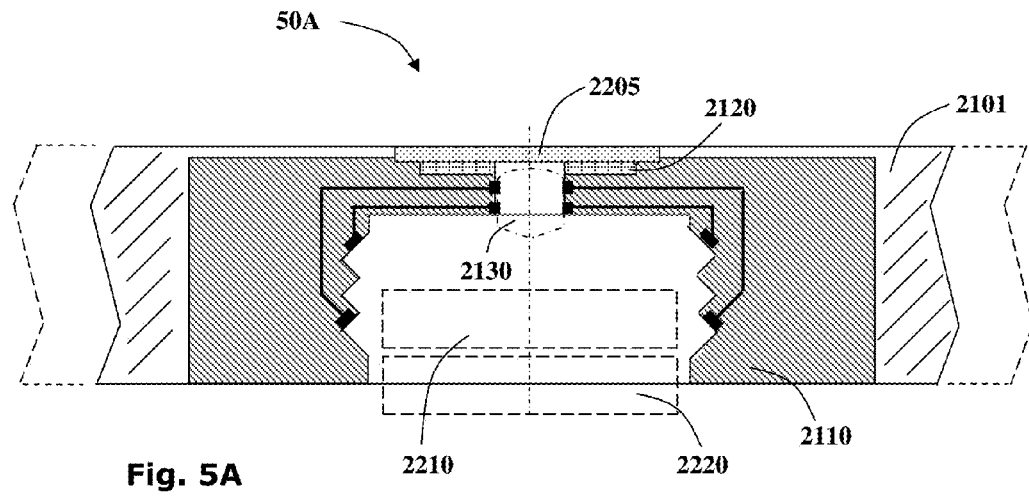
FIG. 5A schematically shows a cross section of a possible embodiment of an in-surface wireless power transfer system of the current disclosure.
Figure 5B:
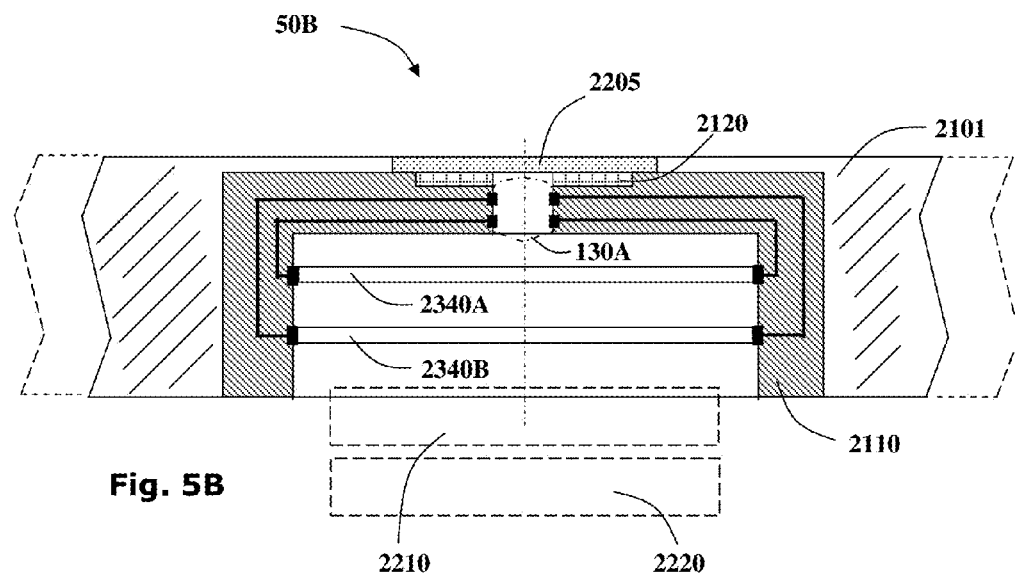
FIG. 5B schematically shows another cross section of a possible embodiment of an in-surface wireless power transfer system of the current disclosure.
Figure 5C:
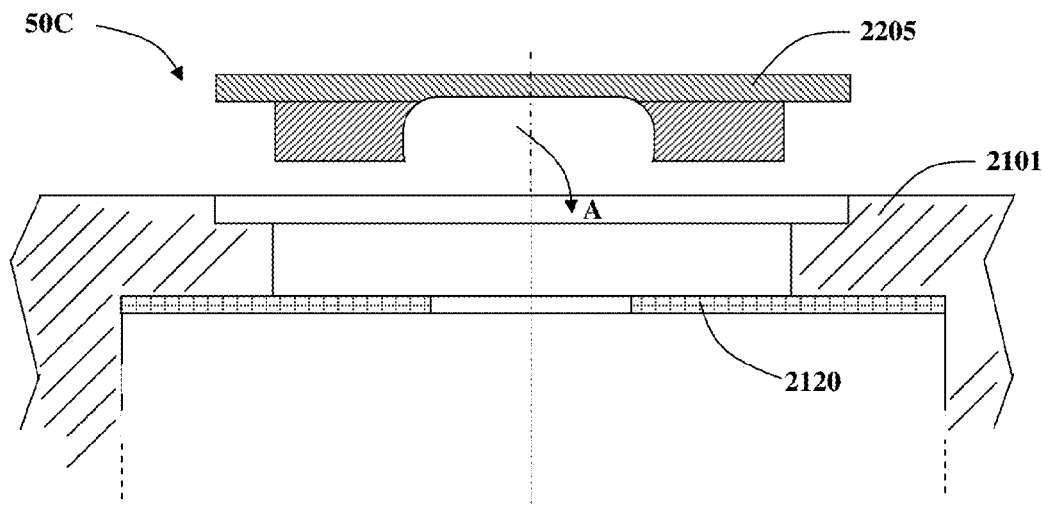
FIG. 5C schematically shows another cross section of a section of the charging spot cover of an in-surface wireless power transfer system of the current disclosure.
Figure 5D:
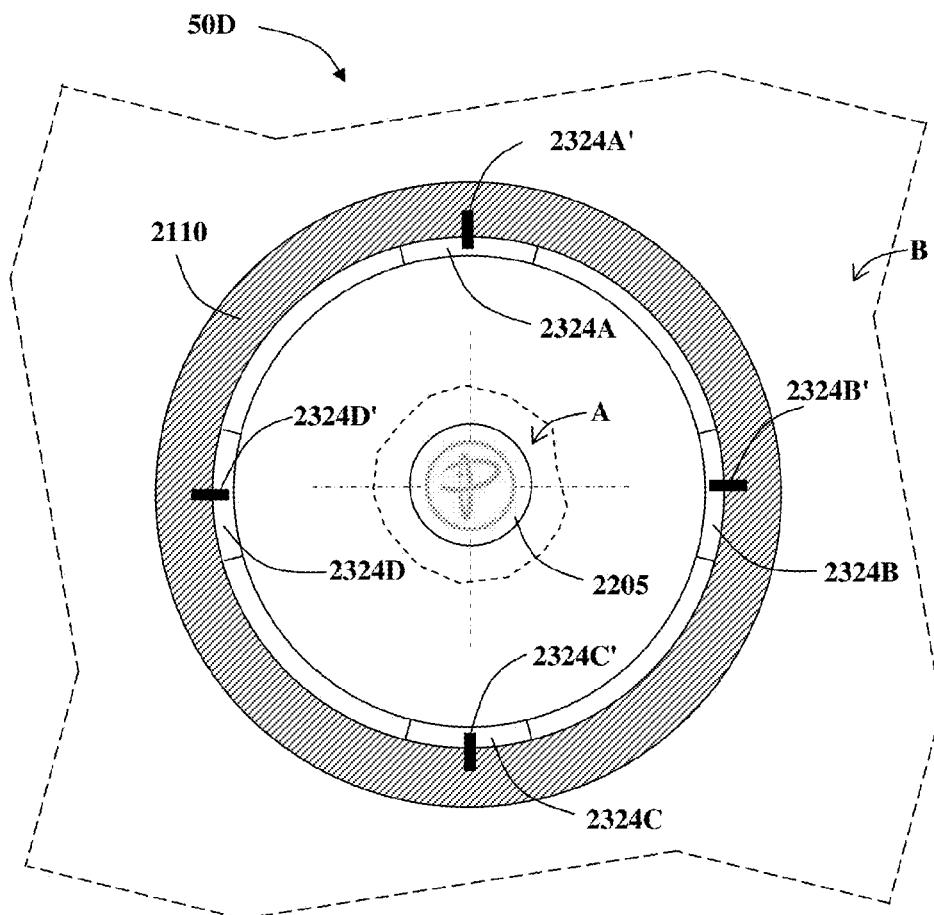
FIG. 5D schematically shows a top view of an in-surface wireless power transfer system of the current disclosure.

Reference is now made to FIGS. 5A-D schematically showing various views and cross sections of possible embodiments of the outlet-host interface structure. FIGS. 5A-B schematically shows cross sections of possible embodiments of an in-surface wireless power transfer mechanism of the current disclosure, with different possible contact arrangements. FIG. 5B schematically shows an enlargement cross section of the charging spot cover of an in-surface wireless power transfer mechanism of the current disclosure, and FIG. 5D schematically shows a top view, in two levels A and B, of an in-surface wireless charging mechanism.

FIG. 5A schematically shows possible functional components and their connectivity into an in-surface inductive power transfer mechanism 50A configured with an outlet-host interface unit 2110 inserted (or molded) into the host 2101, an authentication mechanism 2120, an indicator 2130 and a charging spot cover 2205. The functional elements (primary inductor unit 2210, driver unit 2220) used to enable the charging mechanism, may be screwed into the outlet-host interface unit 2110 via the outlet coupler, to allow power delivery through a set of threaded wired contacts.

FIG. 5B schematically shows possible functional components and their connectivity into an in-surface inductive charging mechanism 50B configured with an outlet-host interface unit 2110 inserted (or molded) into the host 2101, an authentication mechanism 2120, an indicator 2130 and a charging spot cover 2205. The functional elements (primary inductor unit 2210, driver unit 2220) used to enable the charging mechanism, may be clicked through flexible rings 2340A and 2340B, for example, into the outlet-host interface unit 2110 via the outlet coupler to allow power delivery through a set of wired contacts at the peripheral of the rings.

FIG. 5C schematically shows another cross section of the charging spot cover of an in-surface wireless power transfer mechanism of the current disclosure. The cross section 50C includes the outer surface of the host 2101, a top charging spot cover 2205 inserted into the upper lip A to form a seamless outer surface enabling to indicate power transfer and location of the charging spot to allow proper placing of a mobile device for charging. Such arrangement may also allow for product marketing indications as described hereinafter (FIG. 5D).

FIG. 5D schematically shows a top view of an in-surface wireless power transfer mechanism of the current disclosure 50D, in two height levels A and B. Level A includes the charging spot cover 2205 inserted on top of host to cover the indicator (not shown) to indicate power transfer and charging spot location and further allow providing marketing indications. Level B refers to a lower cross section, allowing viewing of a possible contact arrangement and includes four possible vertical contact placers 2324A-D holding 4 set of contacts' elements 2324A'-D'.

It is noted that, where appropriate, the outlet-host interface unit 2110 may comprise a casing body structured of a sleeve, in suitable dimensions to fit into a cavity within the interface unit of a sleeve, and a top cover. The top cover may serve as the charging spot cover 2205, to provide seamless integration, and substantially flush with the outer surface 2101 of the host.

Figure 6:
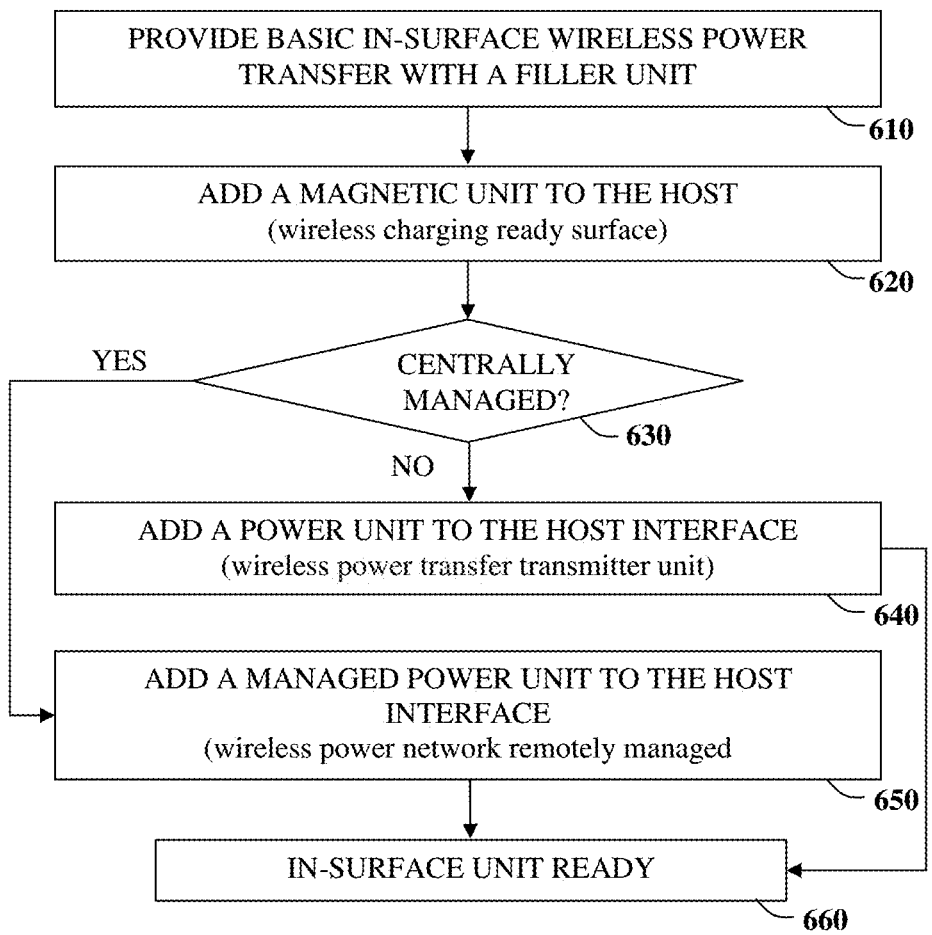
FIG. 6 is a flowchart representing selected actions of a method for acquiring a fully functional in-surface wireless charging mechanism.

Reference is now made to the flowchart of FIG. 6, illustrating selected actions of a method for acquiring a fully functional in-surface wireless charging mechanism of the current disclosure. The method includes the steps: providing a basic in-surface wireless power transfer mechanism with a filler unit—step 610; adding a magnetic unit (a primary inductor unit) to the outlet-host interface unit—step 620 to form a wireless power transfer ready surface; if charging functionality is required for household or office or office uses—step 630, then adding a power unit (a driver unit) to the outlet-host interface unit to form a wireless charging transmitter unit—step 640; if charging functionality is required central and remote management power unit, then adding a managed power unit—step 650 to form a wireless power network remotely managed surface.

It is noted that the host may be prefabricated for using as an in-surface wireless power transfer mechanism, for example during molding or manufacturing of a plate (FIGS. 2A-D, 2101 for example). Alternatively, the outlet-host interface unit (FIGS. 2A-D, 2110) may be inserted into a passageway or hole (FIG. 4A, 40A) that may be drilled or cut into a host surface (FIGS. 2A-D, 2101 for example), for example using a cup-drill. Optionally, the basic unit may be provided without a filler unit.

Figure 7:
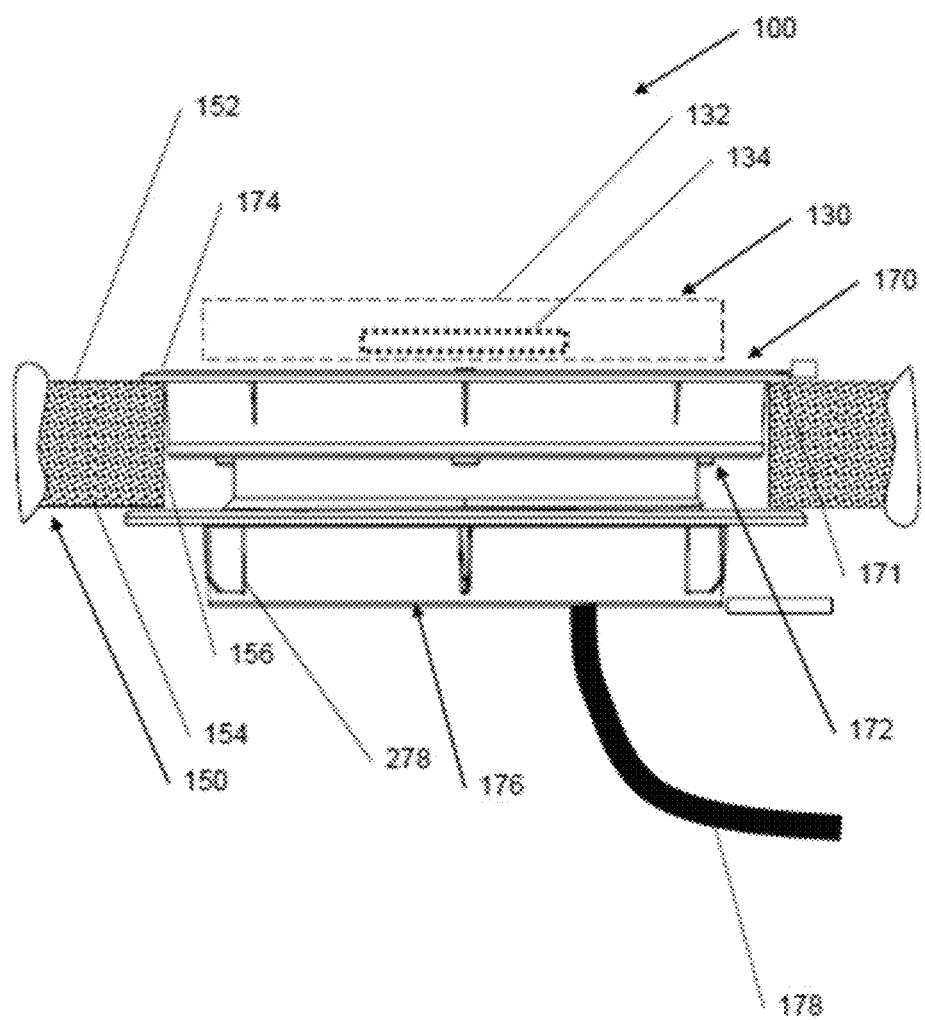
FIG. 7 schematically showing a cross section of a wireless power transfer system, used for wirelessly charging a chargeable device according to an exemplary embodiment of the current disclosure.
Figure 8:
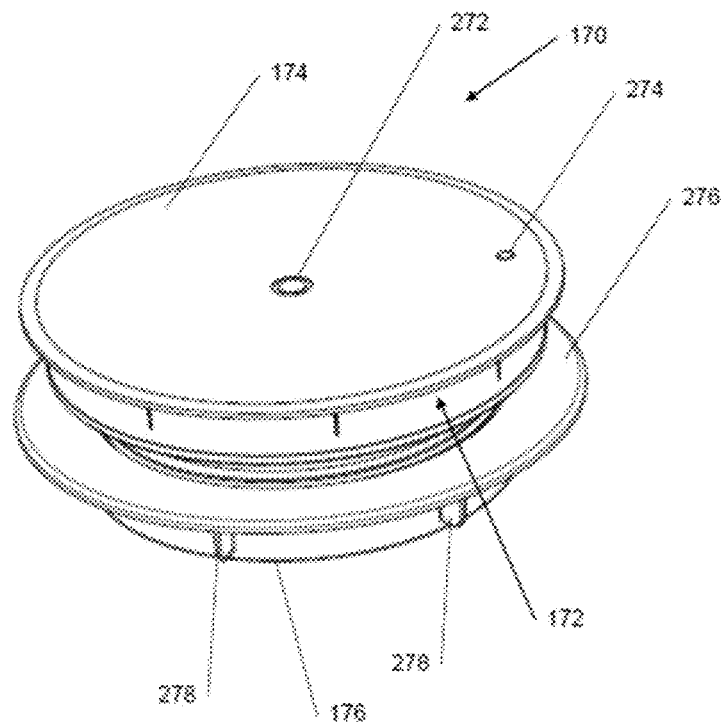
FIG. 8 schematically depicts an isometric view of an assembled wireless power transfer system according to another embodiment of the current disclosure.

Reference is now made to FIG. 7 schematically showing a cross section of a wireless charging system 100 used for wirelessly charging chargeable device 130 according to an exemplary embodiment of the current disclosure.

To charge the chargeable battery within chargeable device 130, chargeable device 130 is placed on top of wireless charger apparatus 170.

Chargeable device 130 may be a mobile phone, a personal entertainment device such as MP3 or iPod, a laptop computer, a PDA (Personal Digital Assistant), a tablet computer or the likes.

A secondary inductor such as a receiver coil 134 in body 132 of chargeable device 130 is inductively coupled, and configured to wirelessly receive electrical energy from a primary inductor such as a transmitter coil within the body 172 of wireless charger 170.

Chargeable device 130 may be integrated with the receiver coil 134 and the energy conditioning electronics (not seen in this figure). Alternatively, receiver coil 134 and the energy conditioning electronics may be attached as "add-on" to the chargeable device 130.

For drawing clarity, details of chargeable device 130 were omitted from the drawings.

It is hereby noted that although for ease of illustration the embodiment described herein relates to a particular application of wireless battery charging using an inductive power transfer. This example is not intended to limit the disclosure and other embodiments may use inductive power transfer power, for example, to directly power electronic equipment such as computers, media players, visual display units and the like as well as other equipment particularly where such equipment may be placed near or integrated with furniture.

Wireless charger 170 comprises a body 172 having top surface 174 substantially flush with the substantially horizontal upper surface 152 of plate 150 of the furniture in which it is embedded.

The furniture may be home furniture, office desk, public area facilities, a table, bedside furniture, a dividing wall or the like.

A passageway or hole 156 in plate 150 is sized to accept the cylindrical body 172 of wireless charger 170 such that lip 171 rests against upper surface 152 of plate 150. Optionally the hole 156 may be circular.

A securing fastener such as a ring, nut 176 or the like is used for securing the body 172 of wireless charger 170 by pressing against the lower surface 154 of plate 150. Protrusions 278 help screwing and tightening securing nut 176 into the threaded body 172 of wireless charger 170 as will be seen in the following figures. This may allow accommodation of wide range of thicknesses of plate 150.

Hole 156 in plate 150 may be pre-made, for example during molding or manufacturing of plate 150. Alternatively, hole 156 may be drilled or cut into plate 150, for example using a cup-drill.

Electric cable 178 may supply AC electrical power from a power outlet, such as a household mains power outlet for example, to power the wireless charger 170. Generally, securing nut 176 and electric cable 178 are concealed under plate 150.

Optionally, lip 171 is conical and configured to sink into plate 150 such that top surface 174 of wireless charger 170 and upper surface 152 of plate 150 are at the same level. This allows sliding chargeable device 130 on the combined surface or resting a chargeable device 130 that is larger than the wireless charger on the combined surface.

Alternatively and/or optionally, hole 156 have a recess sized to accommodate lip 171 of body 172 of wireless charger 170 such that top surface 174 of wireless charger 170 and upper surface 152 of plate 150 are at the same level.

FIG. 2 schematically depicts an isometric view of assembled wireless charger 170 according to an exemplary embodiment of the current disclosure.

Seen in this figure is upper lip 276 of securing nut 176 that presses against lower surface 154 of plate 150 when the wireless charger 170 is secured to the plate 150.

Top surface 174 of wireless charger 170 comprises an optional centering marking 272 used for assisting the user in placing the chargeable device on the top surface 174 of wireless charger 170 such that it is aligned for optimal charging efficiency. Centering marking 272 may be engraved into or painted onto top surface 174.

Optional status indicator 274, visible on top surface 174 may be used to indicate the charging status. Status indicator 274 may be a single or multicolor LED. Status indicator 274 may indicate for example one, or few charging statuses such as: charger ready; charging in progress; charging ended; battery fully charged; misaligned chargeable device; or correctly aligned chargeable device. Charging status may also be announced by an optional speaker (seen in the following figures).

Figure 9:
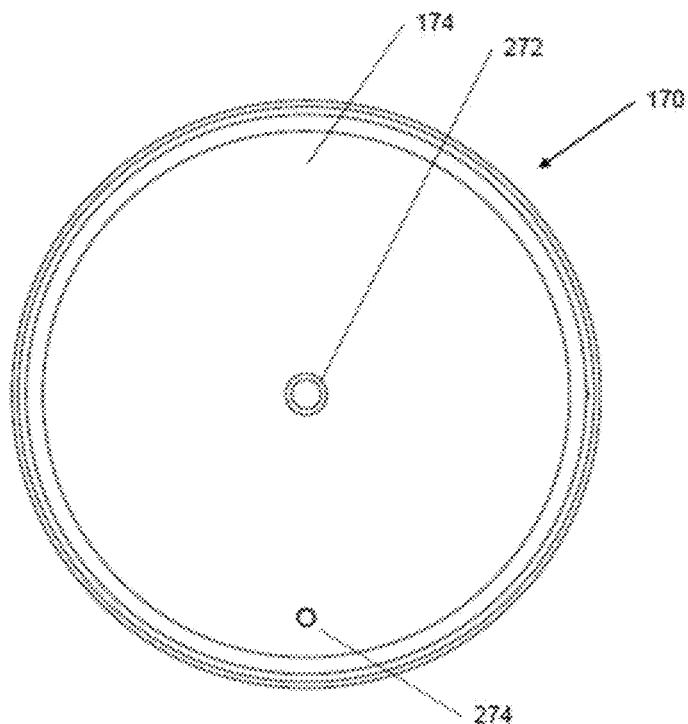
FIG. 9 schematically depicts a top view of a wireless power transfer system according to an exemplary embodiment of the current disclosure.

FIG. 9 schematically depicts a top view of a wireless charger 170 according to an exemplary embodiment of the current disclosure.

Figure 10:
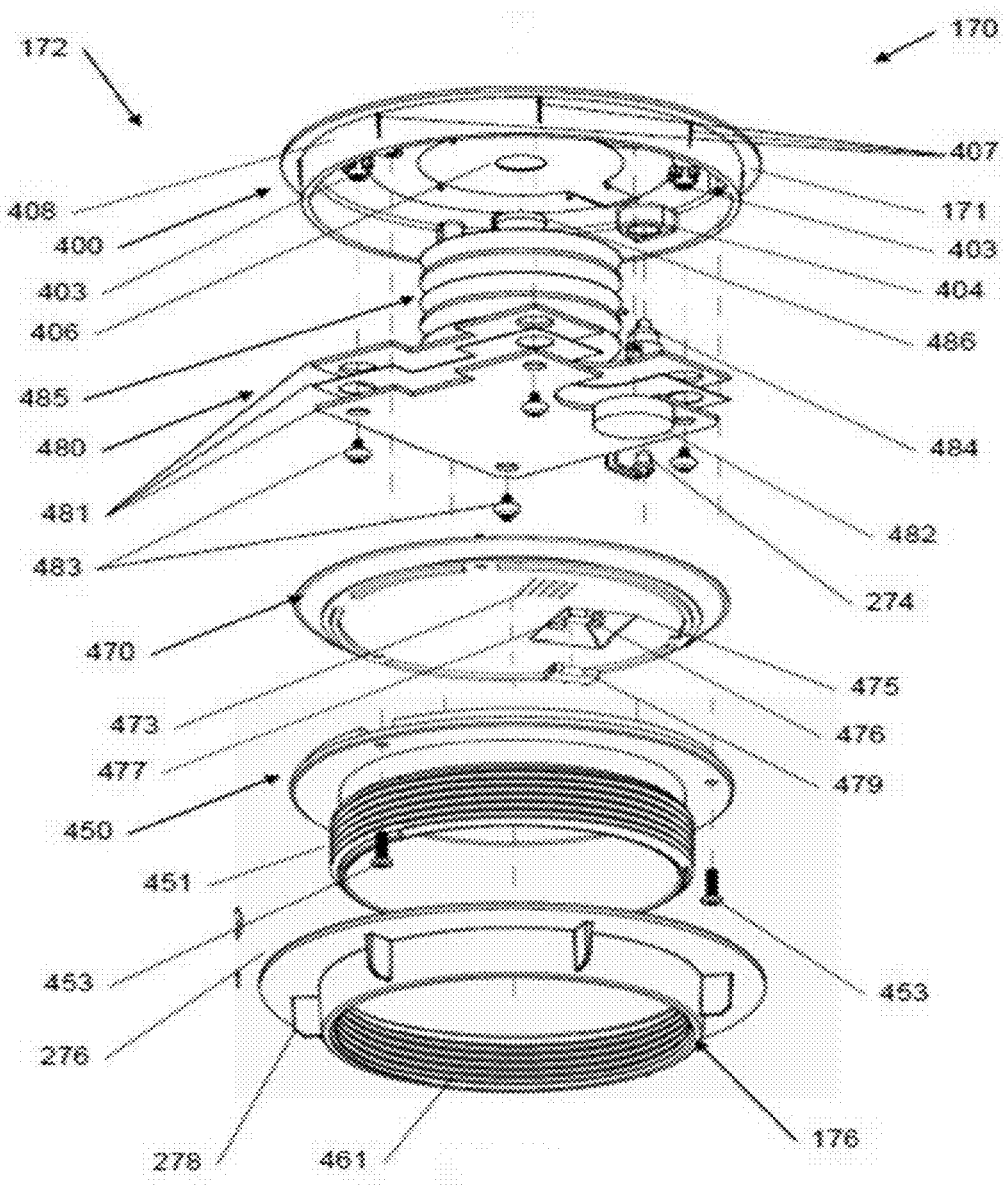
FIG. 10 schematically depicts an exploded isometric view of wireless power transfer system according to an exemplary embodiment of the current disclosure.

FIG. 10 schematically depicts an exploded isometric view of wireless charger 170 according to an exemplary embodiment of the current disclosure.

Body 172 of wireless charger 170 comprises a first cover 400; a sleeve 450 and a second cover 470 forming together a case for holding the charging electronics 480.

Seen in this figure is the inner thread 461 in securing nut 176, which engages with outer thread 451 on cylinder 450.

Screws 453 (only two shown) are used for holding together first cover 400; sleeve 450 and second cover 470 thus forming a case for holding the charging electronics 480.

Second cover 470 comprises optional acoustic screen or holes 473 for conducting audio announcements from the optional speaker 482 in charging electronics 480.

Bottom cover 470 further comprises optional power socket 475 having electrical contacts 477 for engaging with electrical plug 479 at the end of electrical cable 178 (FIG. 7). Optional plug retaining latch 476 holds the plug 479 in place when inserted into socket 475. Alternatively, electric cable 178 is permanently attached to bottom cover 470.

Charging electronics 480 comprises electronic printed boards 481 (three are seen, but number may vary), held in place to top cover 400 by screws 483 (four are seen, but number may vary), which are screwed into corresponding holes 403 in top cover 400.

Optional speaker 482 is preferably aligned with acoustic passageway such as an acoustic screen, holes 473 or the like in bottom cover 470.

Optional status indicator 274 is optionally held in place by optional LED retainer 484 and aligned with a LED retaining structure 404 having a hole in top cover 400.

Charging electronics 480 further comprises at least one transmitter coil 485 for inductively transmitting electric power to receiver coil 134 in body 132 of chargeable device 130. The transmitter coil 485 optionally comprises a plurality of layers and may further comprise ferroelectric core.

It is noted that according to various embodiments wireless charger units 170 may be provided having any number of primary inductors such as the transmitter coil 485. Such primary inductors may be operable independently or in combination to provide power to electric loads via inductive power receivers placed in their vicinity.

As required, the primary inductors of the wireless charger units may be configured and operable to couple loosely with secondary inductors of inductive power receivers placed within an extended range thereof.

Alternatively or additionally, such primary inductors may be configured and operable to couple tightly with the secondary inductors of inductive power receivers aligned thereto. Accordingly, at least one alignment magnet 486 may be provided for assisting the user in aligning the receiver coil 134 with at least one of the transmitter coils 485. Optionally alignment magnet 486 is placed at the center of the round top cover 400 by fitting in magnet reassess 406.

Optional teeth 407 on the circumference 408 of top cover 400 helps stabilize wireless charger 170 to plate 150 by being wedged against the surface of hole 156 as the charger is inserted and secured in place by securing nut 176.

Figure 11:
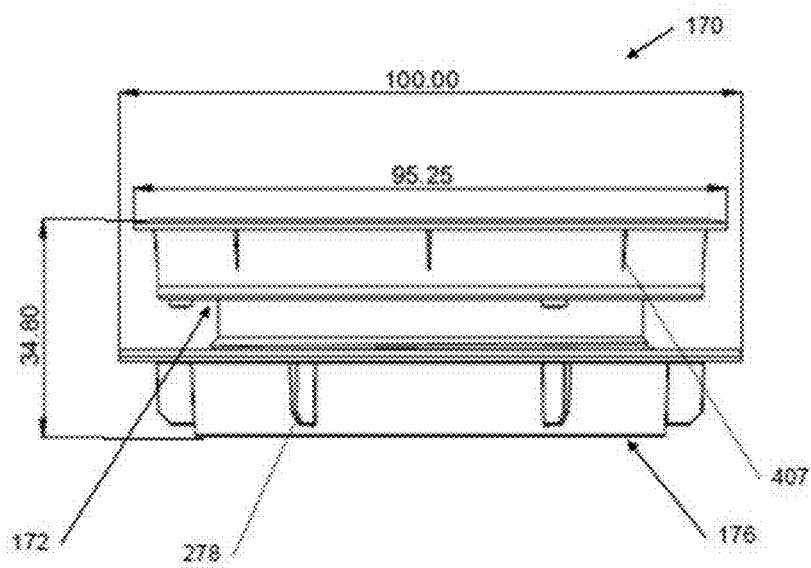
FIG. 11 schematically depicts a side view of a wireless power transfer system according to an exemplary embodiment of the current disclosure showing typical non limiting dimensions of the charger.

FIG. 11 schematically depicts a side view of a wireless charger 170 according to an exemplary embodiment of the current disclosure showing typical non limiting dimensions of the charger.

Figure 12:
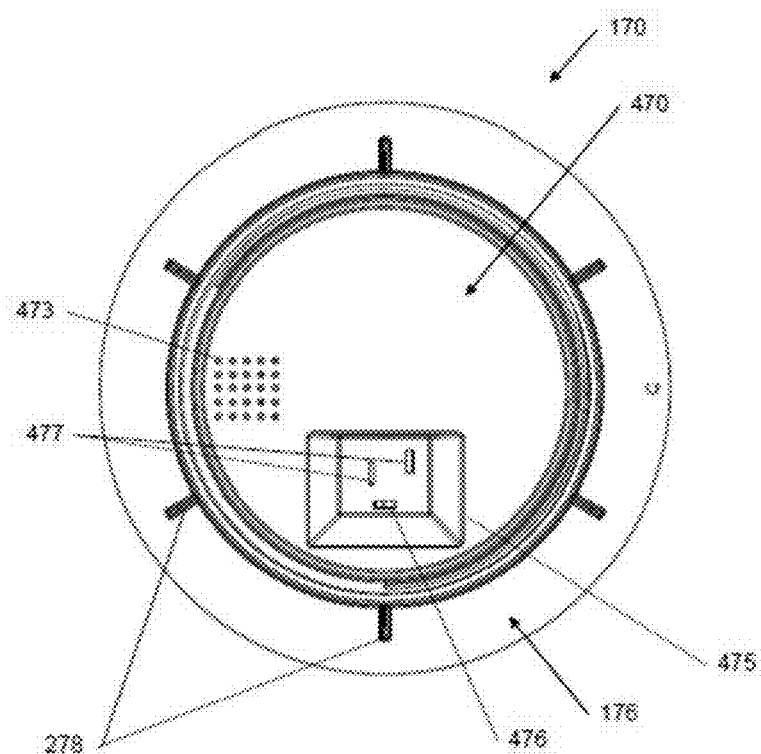
FIG. 12 schematically depicts a bottom view of a wireless power transfer system according to an exemplary embodiment of the current disclosure.

FIG. 12 schematically depicts a bottom view of a wireless charger 170 according to an exemplary embodiment of the current disclosure.

To install the wireless charger; the installer: drills a hole 156 of suitable dimensions in an exposed substantially horizontal plate 150 of a furniture; inserts the body 172 of a wireless charger 170 from the exposed side of the substantially horizontal plate 150; from the underside of the substantially horizontal plate 150, fasten a securing fastener 176 such that top surface 174 of wireless charger 170 is substantially flush with upper surface 152 of plate 150; and from underside of plate 150, connect electrical cable 178 to socket 475 in wireless charger 170, and plug the other side of electrical cable 178 to a household electric outlet.

To charge a chargeable device 130, the user simply places it on top of the installed wireless charger 170 such that its receiving coil is substantially aligned with the transmitting coil within the charger.

Figure 13A:
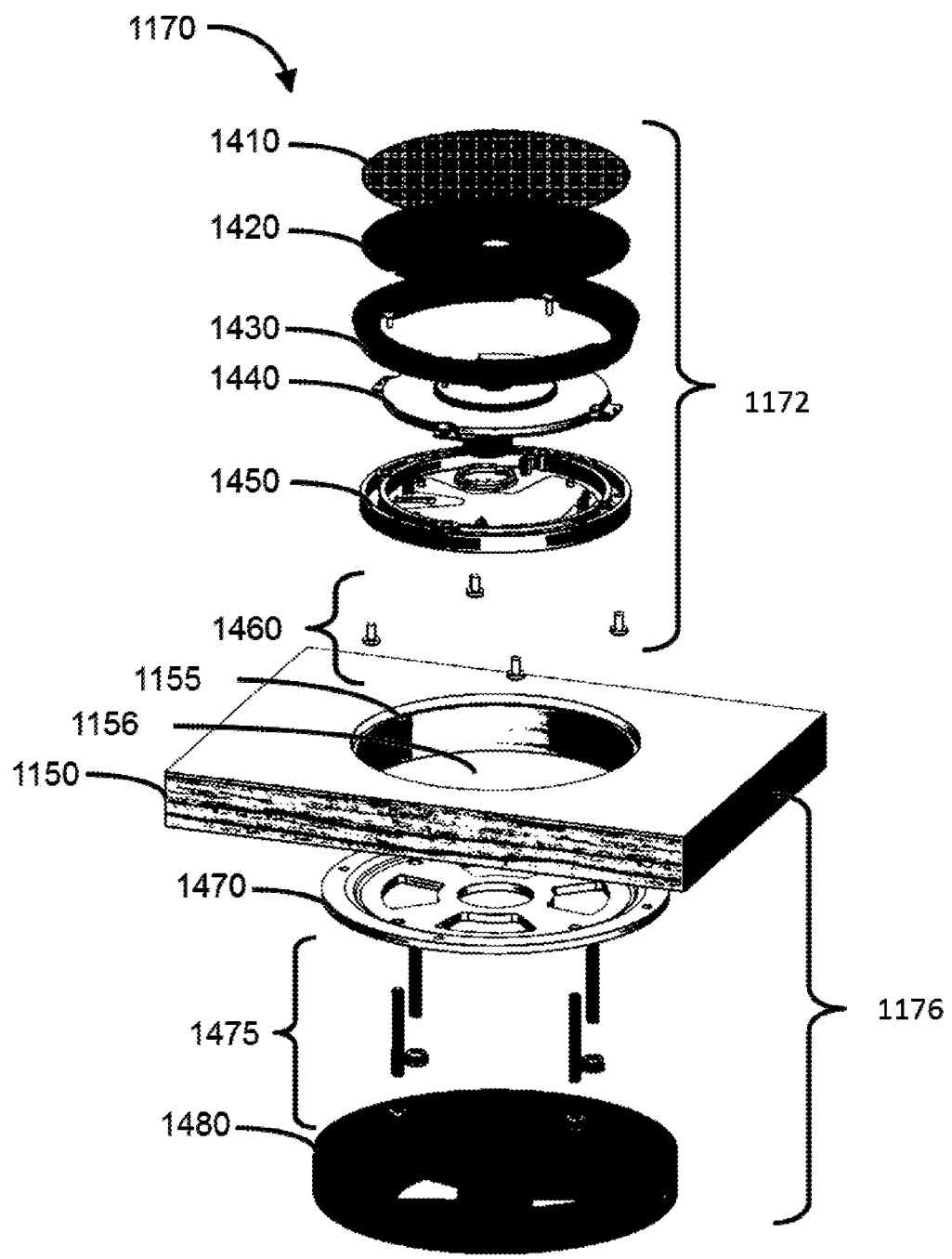
FIG. 13A schematically depicts an exploded isometric view of wireless power transfer system according to a second exemplary embodiment of the current disclosure.
Figure 13B:
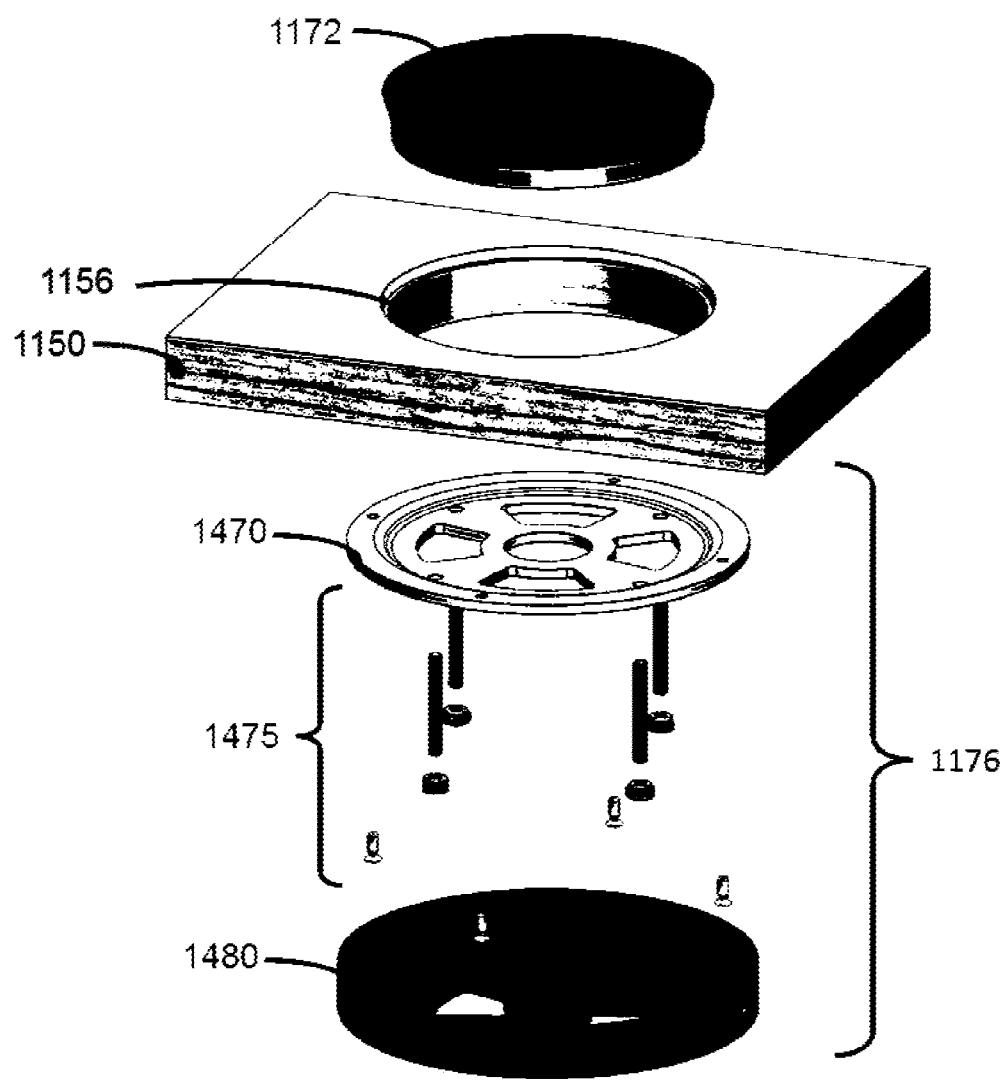
FIG. 13B schematically depicts an exploded isometric view of wireless power transfer system according to a second exemplary embodiment of the current disclosure.

Reference is now made to FIG. 13A schematically depicting an exploded isometric view of wireless charger 1170 according to another exemplary embodiment of the current disclosure.

The body 1172 of wireless charger 1170 may comprise a top cover 1410; a printed circuit (PC) 1420, a rim 1430, electronic component 1440 and bottom cover 450. The body 1172 may further comprise screws 1460 to hold the components together.

The top cover 1410 may be constructed from a durable, non-magnetic, waterproof material such as glass, plastic, wood and the like. In one particular, embodiment, the top cover 1410 is constructed from tempered glass. Optionally the cover is constructed from a plate of tempered glass having a thickness of about 0.5 millimeters or less. In still other embodiments, the thickness may be greater than 0.5 millimeters.

The rim 1430 may be constructed out of, e.g., aluminum.

The securing fastener 1176 of the wireless charger 1170 may comprise a locking device 1470 and a securing cover 1480. The securing fastener 1176 may further comprise screws 1475 to connect with the body 1172 and secure the wireless charger 1170 in place within the passageway or hole 1156 in plate 1150 of the furniture in which it is embedded.

The furniture may be a home or office desk, a table, a bedside furniture, a dividing wall or the like.

Reference is now made to FIG. 7B schematically depicting an exploded isometric view of wireless charger 1170, with the body 1172 intact (un-exploded) and the securing fastener 1176 (comprising the locking device 1470, securing cover 1480 and screws 1475.

Figure 14:
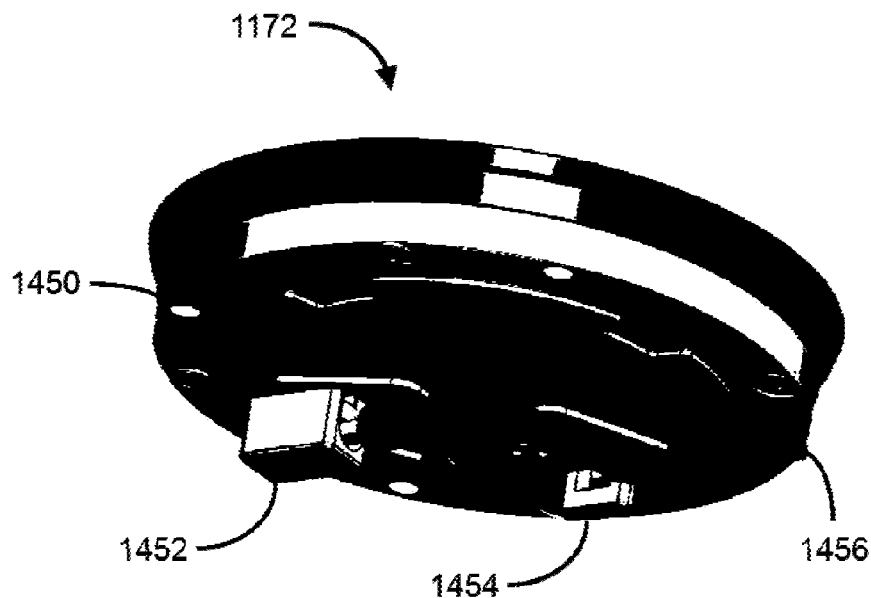
FIG. 14 schematically depicts a bottom isometric view of the body of the wireless power transfer system.

Reference is now made to FIG. 14 schematically showing a bottom orthogonal view of the body 1172. The bottom cover 1450 may comprise a cable input 1452 and a strain relief 1454. The cable 1456 may be locked with a zip tie (not shown) to the strain relief 1454 on the bottom cover.

Figure 15:
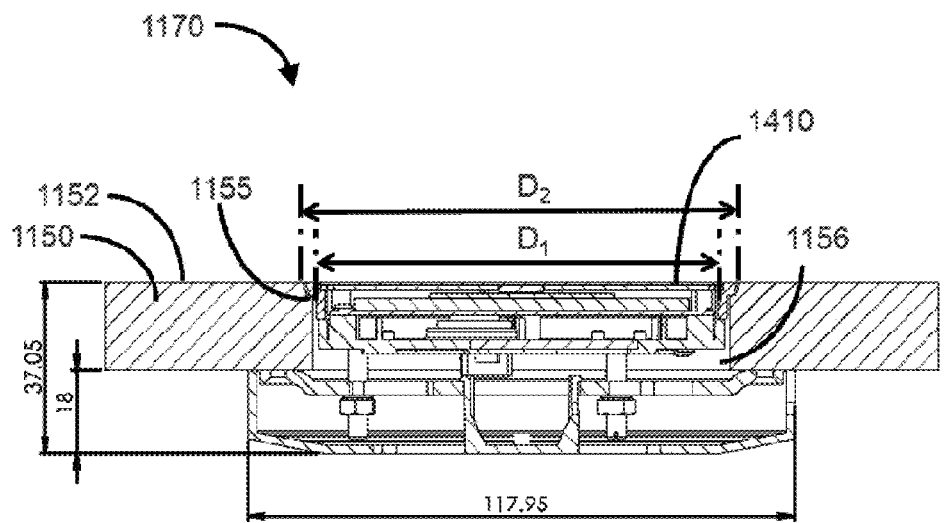
FIG. 15 schematically depicts a cross sectional view of the wireless power transfer system.

Reference is now made to FIG. 15 schematically showing a cross section of another embodiment of a wireless charger 1170. The top cover 1410 of the body 1172 may be substantially flush with the substantially horizontal upper surface 1152 of plate 1150. A passageway or hole 1156 in plate 1150 is sized to accept the cylindrically shaped body 1172 of wireless charger 1170 such that the top cover is even with the upper surface 1152 of plate 1150. Optionally the hole 1156 may be circular.

It is noted that the hole 1156 may include a lower section having a first diameter and an upper portion having a second diameter. The second diameter may be larger than the first diameter include such that a lip 1155 is formed. Accordingly the top cover 1410 may have dimensions selected such that it may fit snugly within the upper portion of the hole thereby forming a surface flush with the upper surface 1152.

Reference is now made to FIG. 16, which shows a data table depicting exemplary, non-limiting examples of the relationship between the thickness of the plate 1150 of a furniture where the wireless charger 1170 is placed (e.g., a table) and the length of the screws 1475 that connect the securing fastener 1176 with the body 1172 to secure the wireless charger 1170 in place within the passageway or hole 1156 in plate 1150. Generally, and as exemplified in the data table of FIG. 10, the screws 1475 should be longer than the thickness of the plate 1150.

It is noted that the disclosure is not limited in its application to the details of construction and the arrangement of the components set forth in the description section or illustrated in the drawings. The disclosure is capable of other embodiments or of being practiced or carried out in various ways. Also, it is to be understood that the phraseology and terminology employed herein is for the purpose of description and should not be regarded as limiting.

It is further noted that the drawings are generally not to scale, and for clarity, non-essential elements were omitted from some of the drawings.

It is also noted that the various embodiments are not limited to the arrangements and instrumentality shown in the drawings and that in discussion of the various figures described hereinabove, like numbers refer to like parts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are Used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly Use the phrase "means for" followed by a statement of function void of further structure.

This written description uses examples to disclose the various embodiments of the disclosure, including the best mode, and also to enable any person skilled in the art to practice the various embodiments of the disclosure, including making and Using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive power outlet system for transferring power to an electric load via an inductive power receiver, said inductive power outlet being embedded into a host, said inductive power outlet comprising:
   at least one outlet unit comprising at least one primary inductor unit and at least one driver unit;
   at least one outlet-host interface unit comprising a host coupler configured to couple said interface unit to said host, and an outlet coupler configured to couple said interface unit to said at least one outlet unit;
   at least one authentication mechanism configured to prevent unauthenticated outlet units from interfacing with said at least one outlet-host interface; and
   at least one power supply unit connectable to said driver unit.

2. The inductive power outlet system of claim 1, wherein said at least one authentication mechanism comprises a mechanical element.

3. The inductive power outlet system of claim 1, wherein said at least one authentication mechanism comprises an electrical contact.

4. The inductive power outlet system of claim 1, wherein said authentication mechanism is configured to transmit an authentication signal to allow operability of said driver unit.

5. The inductive power outlet system of claim 1, further comprising an indicator light operable to indicate when said at least one outlet unit is actively transferring power to said electrical load.

6. The inductive power outlet system of claim 5, wherein said indicator light is further capable of indicating outlet location on said host.

7. The inductive power outlet system of claim 1, wherein said host coupler comprises a fastening mechanism for securing said at least one outlet-host interface unit to said host.

8. An outlet-host interface unit for coupling an outlet unit with a host, said outlet unit for enabling inductive power transfer to an electric load via an inductive power receiver, said outlet-host interface unit for embedding said outlet unit into a host, said outlet-host interface unit comprising:
   at least a host coupler configured to couple said outlet-host interface unit to said host;
   at least an outlet coupler configured to couple said outlet-host interface to said outlet unit; and
   at least one authentication mechanism configured to prevent unauthenticated outlet units from interfacing with said outlet-host interface unit.

9. The outlet-host interface unit of claim 8 further comprising at least one indicator light operable to indicate when said inductive power outlet unit is actively transferring power to said electrical load.

10. The outlet-host interface unit of claim 8 further comprising a casing body having dimensions suitable for introduction into a cavity within said host; and a fastening mechanism for securing said casing body to said host.

11. The outlet-host interface unit of claim 8 further comprising a casing body comprising:
   a sleeve having a substantially circular cross-section; and
   a first cover, wherein said first cover is configured to lie substantially flush with an outer surface of said host.

12. The outlet-host interface unit of claim 11, further comprising a filler unit configured to attach to an underside of said sleeve thereby closing said casing body.

13. The outlet-host interface unit of claim 8, wherein said casing body is molded into said host.

14. The outlet-host interface unit of claim 8 configured to support a primary inductor of the outlet unit at a minimum distance from an outer surface of said host.

15. The outlet-host interface unit of claim 14 wherein said minimum distance is at least four millimeters.

16. The outlet-host interface unit of claim 8 wherein said authentication mechanism is further configured to communicate an identification code.

17. The outlet-host interface unit of claim 16 wherein said identification code uniquely identifies at least one of the host, a manufacturer of the host, an owner of said host.

18. An outlet unit for transferring power to an electric load via an inductive power receiver, said outlet unit configured to be embedded into a host via an outlet-host interface unit, wherein said outlet unit comprises:
   at least one interface coupler configured to couple to said outlet-host interface unit;
   at least one primary inductor unit; and
   at least one outlet authentication element configured to couple with a corresponding interface authentication element of the outlet-host interface such that said outlet unit is authenticated.

19. The inductive power outlet unit of claim 18, further comprising at least one driver unit inserted connectable to said at least one primary inductor unit.

20. The inductive power outlet unit of claim 19, wherein said at least one driver unit is operable to communicate with said interface authentication element associated with said interface unit.

21. The inductive power outlet unit of claim 18, wherein said at least one driver unit is operable to render at least one indicator light operable to indicate when said inductive power outlet unit is actively transferring power to an electrical load.

22. The inductive power outlet unit of claim 18, wherein said at least one driver unit is connectable to a power supply unit.

* * * * *